(12) United States Patent
Nishihara et al.

(10) Patent No.: US 7,573,549 B2
(45) Date of Patent: Aug. 11, 2009

(54) OPTICAL DEVICE, POLARIZING PLATE, DIFFUSER, DIFFUSING FILM, POLARIZING FILM AND LIQUID CRYSTAL IMAGE DISPLAY APPARATUS

(75) Inventors: Takashi Nishihara, Soka (JP); Hideaki Homma, Ashikaga (JP); Yusuke Tochigi, Tokyo (JP); Shigetomo Sakakibara, Koshigaya (JP)

(73) Assignee: Toppan Printing Co., Ltd., Tokyo (JP)

( * ) Notice: Subject to any disclaimer, the term of this patent is extended or adjusted under 35 U.S.C. 154(b) by 162 days.

(21) Appl. No.: 11/892,787

(22) Filed: Aug. 27, 2007

(65) Prior Publication Data
US 2008/0055523 A1 Mar. 6, 2008

(30) Foreign Application Priority Data
Aug. 29, 2006 (JP) ............................ P2006-232137
Sep. 5, 2006 (JP) ............................ P2006-239955
Sep. 27, 2006 (JP) ............................ P2006-262012

(51) Int. Cl.
*G02F 1/1335* (2006.01)

(52) U.S. Cl. ...................................................... 349/112
(58) Field of Classification Search ................... 349/112
See application file for complete search history.

(56) References Cited

FOREIGN PATENT DOCUMENTS

| JP | 10-10513 | 1/1998 |
|---|---|---|
| JP | 2004-4763 | 1/2004 |

*Primary Examiner*—David Nelms
*Assistant Examiner*—Phu Vu

(57) ABSTRACT

An optical device includes a plastic-based film and a diffusing layer. The diffusing layer includes inner scattering elements that selectively scatter visible light having a wavelength range, and has pencil hardness of more than 2H under a 500 g-load specified in ISO/DIS 15184. When the optical device is arranged at a front side of a liquid crystal display apparatus that displays color near 8 test colors specified in CIE 1974, as a test color, chrominance Δu'v' of less than 0.05 is obtained based on a chromaticity coordinate ($u_0'$, $v_0'$) of CIE1976UCS observed in the front surface 100A1 of the liquid crystal display apparatus and a chromaticity coordinate (u', v') observed at an observation angle of ±60 degrees in horizontal and vertical directions of a screen of the liquid crystal display apparatus when a direction perpendicular to the screen is assumed to be 0 degrees.

20 Claims, 20 Drawing Sheets

OPTICAL DEVICE, POLARIZING PLATE, DIFFUSER, DIFFUSING FILM, POLARIZING FILM AND LIQUID CRYSTAL IMAGE DISPLAY APPARATUS

BACKGROUND OF THE INVENTION

1. Field of the Invention

The present invention relates to an optical device, a polarizing plate, a diffuser, a diffusing film, a polarizing film, and a liquid crystal image display apparatus, which are capable of suppressing luminance of a liquid crystal display apparatus (liquid crystal image display apparatus) from being lowered by dispersing (diffusing) light, thereby decreasing color variation in different view angles.

The present invention also relates to a liquid crystal image display apparatus, such as a liquid crystal TV, having a vertical-aligned liquid crystal cell in which liquid crystal molecules are vertically aligned under no application of a voltage, for example.

This application is based on Japanese Patent Application Nos. 2006-232137 filed on Aug. 29, 2006, 2006-239955 filed on Sep. 5, 2006, and 2006-262012 filed on Sep. 27, 2006, the contents of which are incorporated herein by reference.

2. Description of Related Art

In the related art, a liquid crystal display apparatus (liquid crystal image display apparatus) provided on a liquid crystal TV, a car navigation system, a PC monitor and so on, includes a liquid crystal panel and a backlight unit which faces the liquid crystal panel and provides light to the liquid crystal panel. The liquid crystal panel includes, for example, a liquid crystal cell including liquid crystal composed of bar-shaped liquid crystal molecules and a pair of substrates having electrodes to apply a voltage to the liquid crystal with the liquid crystal interposed between both substrates, a pair of polarizing plates (analyzer and polarizer) which transmit only unidirectional oscillating light respectively with the liquid crystal cell interposed therebetween, and RGB color filters which are interposed between the polarizing plate (analyzer) which are arranged at a front side (foreside) in which an image of the liquid crystal image display apparatus is displayed and the substrate.

This kind of liquid crystal display apparatus is classified as a TN (Twisted Nematic) type, VA (Vertical Alignment) type, an IPS (In Plane Switching) type, an OCB (Optically Compensated Bend (Optically Compensated Birefringence)) type, etc. based on the difference between alignment directions (orientations) of liquid crystal molecules depending on conditions of application of a voltage. In a TN type liquid crystal display apparatus, liquid crystal molecules are twistedly aligned (twisted orientation) by 90 degrees with an axis perpendicular to the substrates under no application of voltage. In this state, as light (incident light) emitted from a backlight transmits a polarizing plate (polarizer) arranged at a rear side (back side) and travels along the twisted orientation of the liquid crystal molecules, oscillation direction of the light is changed to the same direction as a transmission axis of a polarizing plate (polarizer) at a front side, and transmitted through the polarizing plate at the front side. On the other hand, if a voltage is applied to the liquid crystal display apparatus, the alignment of the liquid crystal molecules is changed in a vertical direction along an electric field. The incident light travels along the liquid crystal molecules aligned in the vertical direction and is intercepted by the polarizing plate at the font side. In this manner, in the TN type liquid crystal display apparatus, display/non-display of an image is controlled based on liquid crystal molecule alignment and light transmission state depending on voltage application conditions.

However, in the TN type liquid crystal display apparatus, since the liquid crystal molecule alignment is in accord with the vertical direction when the voltage is applied, light in the vertical direction with respect to a display plane is completely intercepted, but light in an inclined direction is leaked without being intercepted. Therefore, when the liquid crystal display apparatus is viewed in a straight direction and an inclined direction with respect to the foreside, light transmissions in both directions are different from each other, and accordingly, an image is differently viewed in both directions (that is, a view angle is small). In addition, since the liquid crystal molecules are in the twisted orientation, although polarization is corrected using a retardation film (phase difference film (phase difference optical device): a film having biaxial refractive anisotropy), gradation inversion in one direction occurs.

In a VA type liquid crystal display apparatus, liquid crystal molecules are aligned perpendicular to substrates (vertical orientation) under no application of a voltage, and the alignment direction of the liquid crystal molecules is changed in a horizontal direction parallel to the substrates to transmit light under application of a voltage. Accordingly, the VA type liquid crystal display apparatus has high contrast and can easily reproduce black gradations, as compared to the TN type liquid crystal display apparatus. However, the VA type liquid crystal display apparatus has a problem of color variation in which gamma (gradation characteristic) is varied depending on a view angle (for example, an image looks white when the image is observed in an inclined direction). In addition, in a case in which a retardation film is applied to the VA type liquid crystal display apparatus, an effect of the retardation film can be obtained only when liquid crystal molecules are vertically aligned, but polarization cannot be corrected for halftone. Therefore, the effect can not be obtained for gradation variation depending on the view angle, and particularly, color variation for blue color having a short wavelength (400 nm to 500 nm) in halftone can not be overcome.

On the other hand, for example, a liquid crystal display apparatus disclosed in Japanese Unexamined Patent Application, First Publication No. H10-10513 includes a backlight (surface light source), a liquid crystal panel, a polarizing plate, a phase difference film (retardation film) and a light diffusing layer. This liquid crystal display apparatus has high contrast by suppressing a rise in black level in an inclined direction using the phase difference film and canceling gradation inversion by using the light diffusing layer, and particularly, it is possible to provide wide-viewing display with no gradation inversion in a downward direction.

For example, a liquid crystal display apparatus disclosed in Japanese Unexamined Patent Application, First Publication No. 2004-4763 includes a backlight system which parallelizes diffused light using a polarizing device (A) having at least two layers of reflecting polarizers (a) overlapping with each other in a wavelength band of selective reflection of polarization, with a phase difference layer (b) interposed between the polarizers (a), a liquid crystal cell which transmits the parallelized light, polarizing plates (analyzer and polarizer) arranged at both sides of the liquid crystal cell, and a view angle extending layer which is disposed at a viewing side (front side) of the liquid crystal cell and diffuses the transmitted light. In this liquid crystal display apparatus, the backlight system converges emitted light rays into only a view angle region having highest contrast and good color reproducibility. In other words, the liquid crystal display apparatus having high resistance to gradation inversion or color tone variation and a good view angle characteristic is obtained by converging light rays, which are leaked in an inclined direction, into a front direction to average the light rays.

However, in the liquid crystal display apparatus disclosed in Japanese Unexamined Patent Application, First Publication No. H10-10513, color variation (color shift) when viewed in different directions can not be sufficiently suppressed although the view angle can be extended and the gradation inversion can be prevented. In addition, the liquid crystal display apparatus disclosed in Japanese Unexamined Patent Application, First Publication No. 2004-4763 is expensive since the backlight system to converge the light rays in the front direction has a complicated structure; and has much loss of light. Moreover, in Japanese Unexamined Patent Application, First Publication No. 2004-4763 disclosing this liquid crystal display apparatus, there is no mention about specified structure of a diffusing film and an effect of color correction, and therefore, it can be considered that the color variation when viewed in different directions can not be sufficiently suppressed.

On the other hand, a diffusing film (antiglare film) having an antiglare function has been put into practical use. However, since this kind of diffusing film has no color correction function, it also can not sufficiently suppress color variation, and assuming that a liquid crystal display apparatus is used for TV, there is a need to provide a separate hard coat layer to protect a front side at which an image is displayed or a separate antiglare layer to prevent reflection of external light, for example. On the other hand, there is a recent keen need to reduce production costs of liquid crystal display apparatuses. Accordingly, such separate provision of a hard coat layer, an antiglare layer, an optical device having only a color correction effect, etc. leads to an increase in the number of manufacturing processes of panel constituent members, which results in high costs due to bad manufacturing yield, and there is a keen need for an optical device having a color correction effect while having both of hard coat and antiglare functions.

In addition, even when a diffusing film is provided at a front side of a liquid crystal panel in order to suppress color shift, the color variation can not be sufficiently suppressed, since the diffusing film can not give a color correction effect. Moreover, since black level luminance at the front side (that is, transmittance at the front side when black is displayed) rises in the entire wide band of wavelength due to light diffusion by the diffusing film, as shown in FIG. 22, a problem occurs in that the black level rises when viewed in an inclined direction.

SUMMARY OF THE INVENTION

Under such circumstances, it is a first object of the present invention to provide an optical device which is capable of preventing color variation or gradation variation from occurring depending on a view angle in a liquid crystal display apparatus (illiquid crystal image display apparatus), particularly a VA type liquid crystal TV, a polarizing plate and a liquid crystal display apparatus having the optical device. It is a second object of the present invention to provide an optical device, a polarizing plate, a diffuser, a diffusing film, a polarizing film, and a liquid crystal image display apparatus, which are capable of giving a hard coat and/or an antiglare function to constituent members, thereby suppressing production costs from increasing due to an increased number of manufacturing processes of the constituent members.

An optical device according to the present invention is provided for a liquid crystal display apparatus which displays an image, the optical device being arranged at a front side of the liquid crystal display apparatus, including: a plastic-based film; and a diffusing layer formed at least one surface of the plastic-based film for scattering light which passes through the diffusing layer, the diffusing layer including: a medium; and inner scattering elements which selectively Mie-scatter visible light having a wavelength range of 400 nm to 500 nm into the medium, the inner scattering elements having a refraction index different from a refraction index of the medium, wherein the diffusing layer has pencil hardness of equal to or more than 2H under a 500 g-load specified in ISO/DIS 15184. When the optical device is arranged at the front side of the liquid crystal display apparatus which displays color near eight test colors specified in CIE 1974, as a test color, the optical device is formed so that chrominance $\Delta u'v'$ obtained according to the following Equation 1 is less than 0.05, based on a chromaticity coordinate $(u_0', v_0')$ of CIE1976UCS observed in the front side and a chromaticity coordinate $(u', v')$ of CIE1976UCS observed at an observation angle of ±60 degrees in horizontal and vertical directions of a screen of the liquid crystal display apparatus when a direction perpendicular to the screen is assumed to be 0 degrees.

$$\Delta u'v' = \{(u'-u_0')^2 + (v'-v_0')^2\}^{0.5} \quad \text{[Equation 1]}$$

According to the present invention, when the optical device is arranged at the front side at which the image of the liquid crystal display apparatus is displayed, since the chrominance obtained from the chromaticity coordinate observed in straight with respect to the front side and the chromaticity coordinate observed at the observation angle of ±60 degrees is equal to or less than 0.05, color variation or gradation variation depending on a view angle can be suppressed without reduction of contrast and luminance. In addition, since visible light having a short wavelength (400 nm to 500 nm) is selectively scattered (i.e., Mie scattering), it is possible to reliably overcome color variation for blue color of a short wavelength in halftone. In addition, since the optical device has the pencil hardness of equal to or more than 2H under a 500 g-load (i.e., 4.9 N) specified in ISO/DIS 15184, hard coat property can be given adding to the color variation suppression effect by one optical device. Accordingly, it is possible to suppress an increase of production costs due to increase of the number of manufacturing process of constituent members.

Preferably, thickness of the diffusing layer is 2 μm to 30 μm.

In this case, the optical device can be formed so that the pencil hardness is sure to be equal to or more than 2H. In addition, since light transmitted the diffusing layer in different directions are sufficiently mixed and scattered (diffused) by the inner scattering elements, it is possible to make reliable color correction according to an effect of wavelength dependence of diffusion.

Preferably, the medium of the diffusing layer is made of a radiation curable resin, and the inner scattering elements are dispersed in the radiation curable resin.

In this case, the light which passes through the diffusing layer can be reliably scattered, and when the diffusing layer is formed, since the diffusing layer can be cured using a simple method including, for example, radiation such as ultraviolet rays after applying a mixture solution of radiation curable resin and inner scattering elements on the plastic-based film, it is possible to form the diffusing layer in which the inner scattering elements are reliably dispersed.

More preferably, the size of the inner scattering elements is 0.5 μm to 3 μm. The size of the inner scattering elements refers to a geometrical particle diameter and can be obtained by measuring the length of the inner scattering elements using an optical microscope or an electron microscope.

In this case, it is possible to reliably reduce back scattering, scatter light having a short wavelength selectively, make a scattering angle large, extend a view angle, and obtain good gradation and color correction while suppressing contrast and luminance from being lowered.

Preferably, a difference in refraction index between the medium and the inner scattering elements is 0.05 to 0.6.

In this case, it is possible to more reliably reduce back scattering, scatter light having a short wavelength selectively, extend a view angle by scattering the light reliably, and obtain good gradation and color correction while suppressing contrast and luminance from being lowered.

Preferably, the inner scattering elements are particles.

In this case, the inner scattering elements can be reliably dispersed in the medium, and the diffusing layer and the optical device can be formed to scatter (diffuse) light reliably.

Preferably, a surface of the diffusing layer is formed to be uneven.

Preferably, some of the inner scattering elements and/or unevenness forming particles mixed into the medium of the diffusing layer, project from the surface of the diffusing layer.

Preferably, the surface of the diffusing layer is formed to be uneven by an emboss process.

In this case, antiglare properties can be obtained by making the surface of the diffusing layer uneven. In addition, since the surface of the optical device is arranged at the outermost surface of the liquid crystal display apparatus, reflection of external light can be prevented. Accordingly, since antiglare properties and hard coat properties can be given to one optical device in addition to a color variation suppression effect, it is possible to reliably suppress an increase of production costs due to an increase of the number of manufacturing processes of constituent members.

Preferably, the optical device is used for the liquid crystal display apparatus having a vertical-aligned liquid crystal cell.

In this case, it is possible to provide a liquid crystal display apparatus with reduced color variation while maintaining merits of high ability to express a dark portion and low production costs of the liquid crystal display apparatus such as a VA type liquid crystal TV.

The present invention provides a polarizing plate including: a polarizing layer; and the optical device being disposed on the polarizing layer.

The present invention provides a liquid crystal display apparatus including the polarizing plate being arranged at a front side at which an image of the liquid crystal display apparatus is displayed.

According to the polarizing plate and the liquid crystal display apparatus of the present invention, it is possible to form the polarizing plate and the liquid crystal display apparatus with the above-described effects since the optical device is arranged to be integrally formed on the polarizing layer,.

A color correction effect could not be nearly obtained, or luminance and contrast reduction, blur, etc. were not within an acceptable range without the range of the present invention. Accordingly, requirements of the present invention are indispensable for the color correction effect. In addition, in the prior art, although a diffusing film is arranged at a front side of a liquid crystal panel to extend a visual field of liquid crystals having another alignment such as TN type liquid crystals in the related art, the present invention has a main object to provide color correction rather than visual field extension. That is, the present invention has an idea different from those of conventional techniques and can not easily be inferred therefrom.

The present invention provides a liquid crystal image display apparatus including: a diffuser; an analyzer; a first biaxial phase difference optical device; a vertical alignment liquid crystal cell; a second biaxial phase difference optical device; a polarizer; and a backlight, which are arranged in order from a front side to a rear side. The diffuser includes inner scattering elements which cause Mie scattering, the analyzer and the polarizer are arranged in cross-Nicol condition, slow axes of the first and second biaxial phase difference optical devices are arranged to be perpendicular to an absorption axis of the analyzer or the polarizer, the first and second biaxial phase difference optical devices compensate a phase difference of the liquid crystal cell, and the diffuser suppresses color shift in halftone.

Mie scattering has small back scattering for visible light, a wide scattering angle, and wavelength dependence. Accordingly, with the liquid crystal image display apparatus of the present invention, since the inner scattering elements which cause Mie scattering are used as diffuser, the analyzer and the polarizer are arranged in cross-Nicol condition, and the slow axes of the first and second biaxial phase difference optical devices are arranged to be perpendicular to the absorption axis of the analyzer or the polarizer; the liquid crystal image display apparatus can be used for a normally black mode (i.e., liquid crystals displaying black under no application of a voltage), color variation (color shift) peculiar to VA type liquid crystals when an image is viewed in an inclined direction can be suppressed by means of the diffuser disposed at an observer side (i.e., observation facet, front side), and light leakage in an inclined direction, which is a drawback of a liquid crystal image display apparatus having the vertical-aligned liquid crystal cell, can be reduced by means of the two biaxial phase difference optical devices. Accordingly, high contrast can be obtained by suppressing a rise in black level when the image is viewed in the inclined direction.

If a diffuser which diffuses (scatters) light over a wide diffusion range is used, external light may be also scattered not only transmitted light, thereby making a rise in black level conspicuous, particularly when the liquid crystal image display apparatus is used in a bright room. However, in the liquid crystal image display apparatus of the present invention, since the diffuser has the inner scattering elements causing Mie scattering, a rise in black level can be reliably suppressed while providing a wide diffusion range by using the inner scattering elements with small back scattering, a wide dispersing angle, and a wavelength dependency.

Preferably, a spectral transmittance of light in an inclined direction during black image is displayed on the liquid crystal image display apparatus has the minimum value in a wavelength range of 410 nm to 610 nm.

In this case, in particular, it is possible to lower black level luminance.

More preferably, the first and second biaxial phase difference optical devices have the same phase difference, that is, in-plane phase difference $R_o$ and vertical phase difference $R_{th}$ of the biaxial phase difference optical devices are the same.

In this case, it is possible to suppress an effect of phase difference by wavelength.

More preferably, the liquid crystal image display apparatus further includes a brightness enhancement film which enhances front luminance, and is arranged at a rear side (i.e., backlight side) of the liquid crystal cell.

In this case, since the brightness enhancement film can concentrate light in the front direction at which quality of the liquid crystal panel is remarkably revealed, the liquid crystal image display apparatus having higher performance can be obtained by diffusing the concentrated light by means of the diffuser.

The present invention provides a diffuser for use in a liquid crystal image display apparatus having a vertical-aligned liquid crystal cell, the diffuser being arranged at a front side at which an image of the liquid crystal panel is displayed, the diffuser suppressing color variation of the image which occurs when an observation angle at the front side is changed. The diffuser has a diffusion characteristic of diffusing equal to or more than 10% of parallel light ray incident in a front direction perpendicular to the front side with an angle range of 35° to 55° with respect to the front direction and diffusing equal to or less than 7% of the parallel light ray with an angle range of 60° to 90° with respect to the front direction.

The present invention provides a diffusing film which is arranged at a front side at which an image of a vertical alignment type liquid crystal panel is displayed, the diffusing film diffusing light incident into the liquid crystal panel, including: a plastic-based film; and the above-described diffuser being provided on the plastic-based film.

The present invention provides a polarizing film which is arranged at a front side at which an image of a vertical alignment type liquid crystal panel is displayed, the polarizing film polarizing light incident into the liquid crystal panel, including the above-described diffuser which is arranged at the front side at which the image is displayed.

The present invention provides a liquid crystal image display apparatus having a vertical alignment type liquid crystal panel, including the above-described diffuser which is arranged at a front side at which an image of the liquid crystal panel is displayed.

With the diffuser, the diffusing film, the polarizing film and the liquid crystal image display apparatus of the present invention, since the diffuser has the diffusion characteristic in which equal to or more than 10% of parallel incident light is diffused in the angle range of 35° to 55° in the front direction, it is possible to suppress color variation when the image is viewed from different observation angles. In addition, since a diffusion characteristic that equal to or less than 7% of parallel incident light is diffused in the angle range of 60° to 90° in the front direction is provided, it is possible to prevent front luminance of an image from being lowered. Accordingly, it is possible to obtain the liquid crystal image display apparatus which displays a clear image observable in any direction according to the present invention.

DETAILED DESCRIPTION OF PREFERRED EMBODIMENTS

First Embodiment

Hereinafter, an optical device, a polarizing plate and a liquid crystal display apparatus having the optical device according to a first embodiment of the present invention will be described with reference to FIGS. 1 to 4. The first embodiment relates to a liquid crystal display apparatus, such as a liquid crystal TV, having a VA type liquid crystal panel in which liquid crystal molecules are vertically aligned, and more particularly, to an optical device (optical film) which suppresses color variation or gradation variation depending on a view angle, and a liquid crystal display apparatus including a polarizing plate having the optical device.

Figure 1:
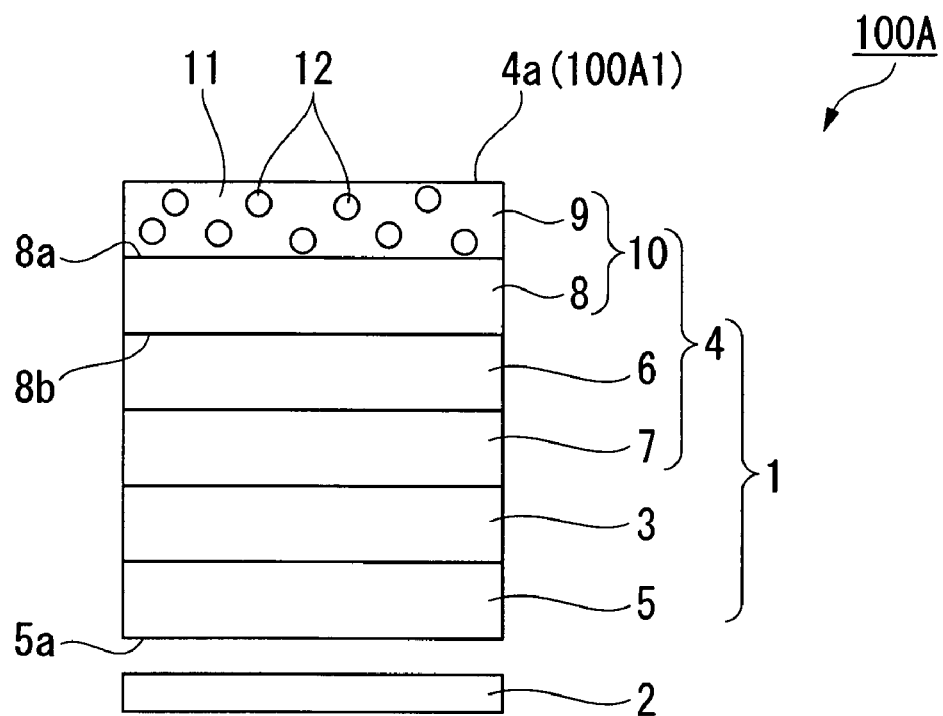
FIG. 1 is a view showing a liquid crystal display apparatus according to a first embodiment of the present invention.

A liquid crystal display apparatus 100A according to the present embodiment includes a liquid crystal panel 1 and a backlight 2 which provides light to the liquid crystal panel 1. As shown in FIG. 1, the liquid crystal pane 1 includes a first polarizing plate 4 and a second polarizing plate 5 laminated on both sides of a plate-shaped VA type liquid crystal cell 3, with the liquid crystal cell 3 interposed between both polarizing plates 4 and 5. The liquid crystal panel 1 is provided with a top layer 4a of the first polarizing plate 4 disposed at a front surface 100A1 of the liquid crystal display apparatus 100A, and the backlight 2 which transmits light to the second polarizing plate 5, the liquid crystal cell 3 and then the first polarizing plate 4, disposed at a rear surface 5a of the second polarizing plate 5.

Figure 2:
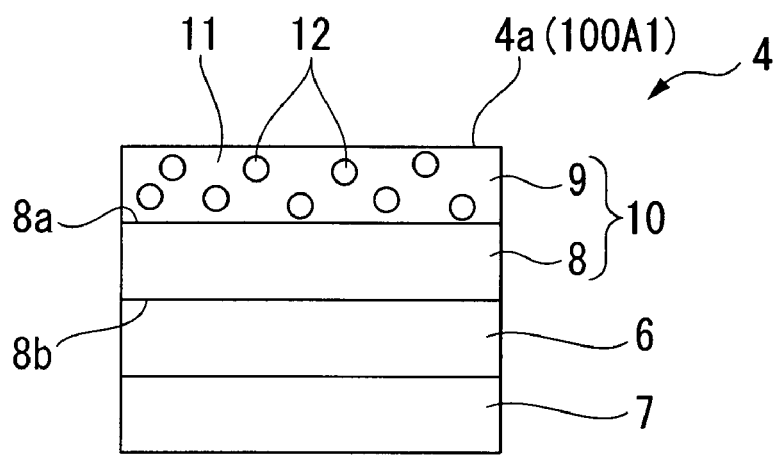
FIG. 2 is a view showing a polarizing plate according to the first embodiment of the present invention.

The first polarizing plate 4 includes a polarizing layer 6 and transparent plastic-based films 7 and 8, with the polarizing layer 6 interposed between the films 7 and 8. The second polarizing plate 5 paired with the first polarizing plate 4 has a structure in which a polarizing layer is interposed between two plastic-based films, like the first polarizing plate 4. In the first polarizing plate 4 disposed at the front surface 100A1 of the liquid crystal display apparatus 100A, an optical film (optical device) 10 formed by laminating a diffusing layer 9 on a first surface (top surface) 8a of the plastic-based film 8 is arranged in such a manner that the diffusing layer 9 is disposed at the front surface 100A1 and a second surface (bottom surface) 8b of the plastic-based film 8 of the optical film 10 contacts the polarizing layer 6, as shown in FIGS. 1 and 2. The optical film 10 may be configured such that the diffusing layer 9 is laminated on the bottom surface 8b of the plastic-based film 8. In this case, the optical film 10 is arranged in contact with the diffusing layer 9 at the bottom surface 8b to the polarizing layer 6.

The plastic-based film 8 of the optical film 10 is, for example, a triacetyl cellulose (TAC) film, a polyethylene terephthalate (PET) film, a cycloolefin film, etc. The plastic-based film 8 is not particularly limited in material as long as it is a transparent plastic-based film.

Figure 3:
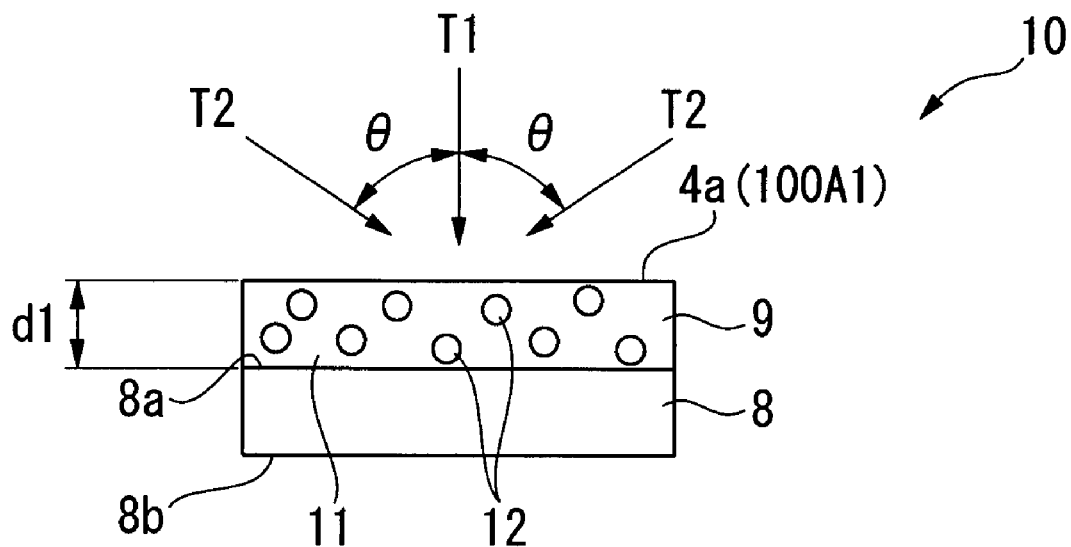
FIG. 3 is a view showing an optical device according to the first embodiment of the present invention.

In the present embodiment, as shown in FIGS. 1 to 3, the diffusing layer 9 includes a radiation curable resin (medium) 11 and inner scattering elements (particles) 12 dispersed in the radiation curable resin 11. The inner scattering elements 12 have a refraction index different from the refraction index of the radiation curable resin 11. As the inner scattering elements 12 are dispersed in the radiation curable resin 11, a plurality of fine regions which are constituted by the inner scattering elements 12 having different refraction indexes are formed in the diffusing layer 9. The inner scattering elements 12 scatter visible light of a wavelength of 400 nm to 500 nm, which is emitted from the backlight 2 and passes through the diffusing layer 9, more strongly (selectively) depending on particle diameter (size) of the inner scattering elements (Mie scattering). The inner scattering elements 12 may be dispersed in the radiation curable resin 11 (the diffusing layer 9) either uniformly or non-uniformly. The size of the inner scattering elements refers to a geometrical particle diameter and is obtained by measuring the length of the inner scattering elements using an optical microscope or an electron microscope. The inner scattering elements are preferably spherical particles, and in this case, the size of the inner scattering elements refers to the diameter of the spherical particles.

The radiation curable resin 11 is preferably a resin having acrylate functional groups, more preferably polyesteracrylate or urethaneacrylate.

Polyesteracrylate is preferably oligomeracrylate or metaacrylate of polyester polyols (hereinafter, "acrylate and/or metaacrylate" will be referred to as "(meth)acrylate") or a mixture thereof.

Urethaneacrylate is made by acrylating oligomer composed of a polyol compound and a diisocyanate compound.

Monomer of acrylate preferably includes methyl(meth)acrylate, ethyl(meth)acrylate, butyl(meth)acrylate, 2-ethylhexyl(meth)acrylate, methoxyethyl(meth)acrylate, butoxyethyl(meth)acrylate, phenyl(meth)acrylate, etc.

Acrylate may be used in combination with multi functional monomer. For example, the multi functional monomer may include trimethylolpropanetri(meth)acrylate, hexanediol(meth)acrylate, tripropyleneglycoldi(meth)acrylate, diethyleneglycoldi(meth)acrylate, pentaerythritoltri(meth)acrylate, dipentaerythritolhexa(meth)acrylate, 1,6-hexanedioldi(meth)acrylate, neopentylglycoldi(meth)acrylate, etc.

Examples of polyesteroligomer include polysebaciate-polyol and polyadipatepolyol, which is a condensate of: sebacic acid and glycol or triol; and adipic acid and glycol (ethyleneglycol, polyethyleneglycol, propyleneglycol, polypropyleneglycol, butyleneglycol, polybutyleneglycol, etc.) or triol (glycerin, trimethylolepropane, etc.).

A polymerization initiator(I) may be mixed into the radiation curable resin 11 in order to polymerize the radiation curable resin 11 efficiently. The polymerization initiator(I) may be a compound which generates radicals when activation energy is supplied. For example, the polymerization initiator (I) may include 1-hydroxycyclohexylphenylketone, 2-hydroxy-2-methyl-1-phenylpropane-1-on, 2-methyl[4-(methyltio)phenyl]-2-morpholinopropane-1-on, 2,2-dimethoxy-1,2-diphenylethane-1-on, benzophenone, 1-[4-(2-hydroxyethoxy)phenyl]-2-hydroxy-2-methyl-1-propane-1-on, 2-benzil-2-dimethylamino-1-(4-morpholinophenyl) butane-1-on, bis(2,6-dimethoxybenzoyl)-2,4,4-trimethylephentylphosphineoxide, etc.

The content of the polymerization initiator(I) is 0.1 to 10 wt %, preferably 1 to 7 wt %, more preferably 1 to 5 wt % for the radiation curable resin of 100 wt %.

Examples of the solvent include: ketones such as methylethylketone, acetone, methylisobutylketone or the like; esters such as methyl acetate, ethyl acetate, butyl acetate or the like; aromatic compounds such as toluene, xylene or the like; ethers such as diethylether, tetrahydrofuran or the like; and alcohols such as methanol, ethanol, isopropanol or the like.

Figure 4:
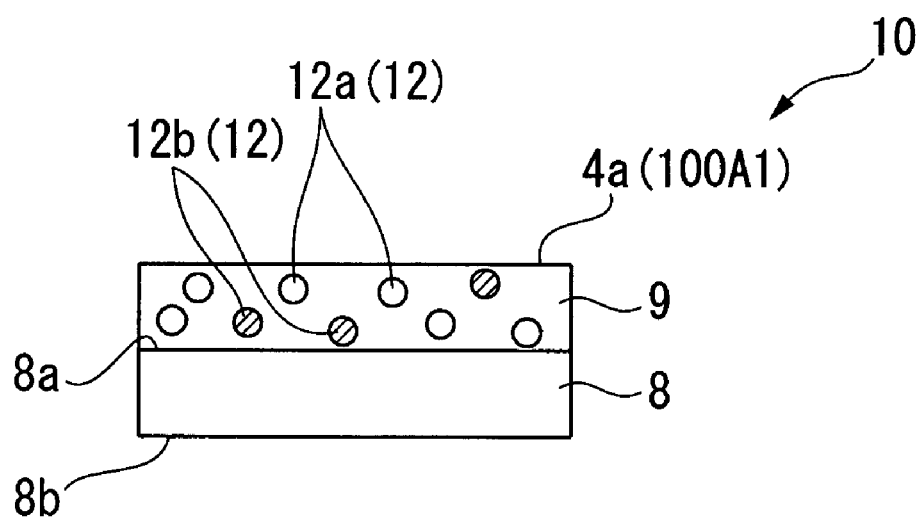
FIG. 4 is a view showing a modification of the optical device according to the first embodiment of the present invention.

In the present embodiment, the inner scattering elements 12 may be, for example: inorganic powders such as powdered glass, glass beads, pulverized glass fiber, titanium oxide, calcium carbonate, silicon dioxide (silica), aluminum oxide, various kinds of clays and the like; or resin powders such as crosslinking or non-crosslinking organic fine particles composed of various kinds of polymers such as polymethylmetacrylate (PMMA), polyurethane, melamine resin and the like. The inner scattering elements 12 may be hollow particles, porous particles, composite particles, etc. In addition, as shown in FIG. 4, the diffusing layer 9 may for example, be formed by dispersing two or more kinds of inner scattering elements 12 (12a and 12b) into the radiation curable resin (medium) 11. The content of the inner scattering elements 12 in the diffusing layer 9 is preferably 3 wt % to 50 wt %.

The optical film 10 having the diffusing layer 9 including the radiation curable resin 11 and the inner scattering elements 12 is formed by coating a mixture solution (coating fluid) of the radiation curable resin 11 and the inner scattering elements 12 on the top surface 8a of the plastic-based film 8 using coating systems known in the art, such as die coater, spin coater, roll coater, curtain coater, screen print or the like, drying the mixture solution, and curing the dried mixture solution by irradiating the mixture solution with on electron beam (EB) or an ultraviolet ray.

In the present embodiment, as shown in FIG. 3, the diffusing layer 9 is formed to be 2 μm to 30 μm in thickness d1. The optical film 10 formed as such has pencil hardness of equal to or more than 2H under a 500 g-load (i.e., 4.9 N) based on a pencil hardness test (ISO/DIS 15184). It is preferable that the optical film 10 have pencil hardness of equal to or more than 3H or 4H.

In the present embodiment, the optical film 10 is disposed at a viewer side (i.e., the front surface 100A1 at which an image is displayed) of the liquid crystal display apparatus 100A. When the liquid crystal display apparatus 100A displays test color near eight test colors specified in CIE (Commission Internationale de l'Eclairage) 1974, the optical film 10 is formed in such a manner that chrominance Δu'v' obtained according to the following Equation (1) is equal to or less than 0.05, based on chromaticity coordinates ($u_0'$, $v_0'$) of CIE1976UCS (Uniform Color Space) observed through the optical film 10 facing the front surface 100A1 of the liquid crystal display apparatus 100A (that is, observed in a direction of arrow T1 in FIG. 3) and chromaticity coordinates (u', v') of CIE1976UCS observed through the optical film 10 at an observation angle θ of ±60 degrees in horizontal and vertical directions of a screen of the liquid crystal display apparatus 100A (that is, observed in a direction of arrow T2 in FIG. 3) when a direction perpendicular to the screen is assumed to be 0 degrees.

$$\Delta u'v' = \{(u'-u_0')^2 + (v'-v_0')^2\}^{0.5} \quad \text{[Equation 1]}$$

Hereinafter, operation and effects of the optical film 10 as constructed above, the first polarizing plate 4 having the optical film 10, and the liquid crystal display apparatus 100A will be described.

It is commonly recommended that the liquid crystal TV (liquid crystal display apparatus 100A) should be viewed in a bright room although sensitivity to a dark portion of an image displayed on the liquid crystal display apparatus 100A is poor as compared when viewed in a dark room. At this time, a contrast ratio may be equal to or more than 100:1 (white level luminance:black level luminance) in order to sufficiently obtain contrast of the liquid crystal display apparatus 100A in the bright room.

In conventional VA type liquid crystal display apparatuses, since alignment of liquid crystal molecules when viewed in a front direction is different from alignment of liquid crystal molecules when viewed in an inclined direction. Therefore, when viewed in the inclined direction, gamma is small, color is dim, and chromaticity Δu'v' is 0.10 or so; thereby varying color greatly. In addition, an image tends to look blue from the front direction while yellow in the inclined direction. A retardation film (i.e., film having biaxial refractive anisotropy) is used to correct this color variation. However, in this case, an effect can be obtained only in particular alignment, that is, in a black state, but an effect can not be sufficiently obtained in correction of halftone.

On the other hand, in the present embodiment, the optical film 10 is arranged on the polarizing layer 6 of the first polarizing plate 4; that is, the optical film 10 is arranged at the front surface 100A1 of the liquid crystal panel 1 (liquid crystal display apparatus 100A). Therefore, light (visible light), which is emitted from the backlight 2 and passes through the second polarizing plate 5, through the liquid crystal cell 3 and then thorough the first polarizing plate 4, is scattered (diffused) by the inner scattering elements 12, thereby providing a liquid crystal display apparatus displaying an image having small color variation even when the image is viewed at a large view angle.

In addition, when the optical film 10 is used in the liquid crystal display apparatus 100A, since the chromaticity Δu'v' is equal to or less than 0.05, chromaticity of the image when the image is viewed in an inclined direction is small as compared to when the image is viewed from the front surface 100A1, thereby suppressing color variation or gradation variation depending on a viewing angle. At this time, since the diffusing layer 9 of the optical film 10 scatters light of a short wavelength of a wavelength range of visible light which passes through the diffusing layer 9, more strongly (selectively) (Mie scattering), that is, since short wavelength light is more scattered, it is possible to reliably overcome color variation for the blue color of a short wavelength (400 nm to 500 nm) in halftone, reliably reduce color variation and a rise in black level of the liquid crystal panel 1 and suppress an image from dazzling.

Although it is not substantially possible to measure color variation for all colors, the optical film 10, the first polarizing plate 4 having the optical film 10 and the liquid crystal display apparatus 100A can be evaluated with high efficiency and reliability using eight test colors specified in CIE1974, i.e., using a representative color, thereby obtaining the optical film 10 of high quality with little color variation, the first polarizing plate 4 having the optical film 10 and the liquid crystal display apparatus 100A.

The optical film 10 is formed to be 2 μm to 30 μm in the thickness d1 of the diffusing layer 9, thereby making it possible to sufficiently mix and diffuse lights which pass through the diffusing layer 9 in different directions and make reliable color correction by wavelength-dependency of diffusion. In addition, since the thickness d1 of the diffusing layer 9 is 2 μm to 30 μm, the optical film 10 is sure to have pencil hardness of equal to or more than 2H to provide sufficient hard coat property. Accordingly, even when the optical film 10 is disposed at the front surface (top surface) 100A1 of the liquid crystal display apparatus 100A, it is hardly damaged, thereby reliably securing quality of the liquid crystal display apparatus 100A. Thus, since one optical film 10 can have both of color variation suppression effect and hard coat property, there is no need to provide an optical device for color correction and a hard coat layer separately, thereby suppressing production costs from increasing due to an increase of the number of manufacturing processes of constituent members. In addition, the optical film 10 may be also used as a protective film of the first polarizing plate 4 at the top surface 100A1.

In addition, since the inner scattering elements 12 are dispersed in the radiation curable resin 11, the diffusing layer 9 can reliably scatter light which passes through the diffusing layer 9. Moreover, when the diffusing layer 9 is formed, a mixture solution of the radiation curable resin 11 and the inner scattering elements 12, which is applied on the plastic-based film 8, can be simply cured using radiation, thereby providing the diffusing layer 9 in which the inner scattering elements 12 are dispersed.

Accordingly, when the optical film 10 according to the present embodiment is applied to the liquid crystal display apparatus 100A having the vertical-aligned liquid crystal cell 3, it is possible to improve gradation characteristics and make proper color correction with a wide diffusion angle while suppressing the lowering of contrast and luminance with merits of high ability to express a dark portion and having a low production cost of the liquid crystal display apparatus 100A such as a VA type liquid crystal TV.

The present invention is not limited to the first embodiment, but may be modified without departing from the spirit of the present invention. For example, although it is illustrated in the present embodiment that the optical film 10 and the first polarizing plate 4 are used to make the chromaticity Δu'v' equal to or less than 0.05 to obtain the liquid crystal display apparatus 100A having no color variation, it is preferable to make the chromaticity Δu'v' equal to or less than 0.04 if there is a need for higher quality. In addition, when the optical film 10 of the present embodiment is added, luminance at the front surface 100A1 may be lowered. This lowering of luminance may be compensated by the backlight 2. However, since even the backlight 2 can not compensate extreme lowering of luminance, the lowering of luminance is restricted to be within preferably 30%, more preferably 20%, of original luminance, as compared before the optical film 10 is added. V of white color specified in JISZ8721 is more than 8.5 or 9.0 which is equivalent to less than about 30% in terms of lowering of luminance. In other words, if the lowering of luminance is within less than 30% of the original luminance, it can be defined that the white color is the same.

Although it is illustrated in the present embodiment that the diffusing layer 9 of the optical film 10 includes the radiation curable resin 11 and the inner scattering elements (particles) 12, the inner scattering elements 12 need not be particulate materials. For example, fluid inner scattering elements 12 may be mixed with and dispersed in the radiation curable resin 11, and, with this mixture solution coated and cured on the plastic-based film 8, fine regions which are composed of the inner scattering elements 12 and have different refraction indexes may be formed in the diffusing layer 9.

In this case, the inner scattering elements 12 need not have a spherical particle shape, and more strongly scatter light having a short wavelength of a wavelength range of visible light depending on the size (average diameter) of the inner scattering elements 12 (Mie scattering). In addition, the medium 11 in which the inner scattering elements 12 are dispersed need not be limited to radiation curable resin, but may be another material only if it is transparent.

Although it is illustrated in the present embodiment that the optical film 10 constitutes a portion of the first polarizing plate 4, the optical film 10 may be separated from the first polarizing plate 4. In addition, although it is illustrated in the present embodiment that the optical film 10 (the first polarizing plate 4) is provided in the VA type liquid crystal display apparatus 100A, the optical film 10 may be applied to a TN type liquid crystal display apparatus, for example.

The optical film 10 and the first polarizing plate 4 may include an antifouling layer and antistatic layer. Antifouling property may be provided to the first polarizing plate 4 by adding an additive in the coating solution when the diffusing layer 9 is formed. An example of the additive may include a silicon surfactant and a fluorine surfactant.

Although it is illustrated in the present embodiment that the inner scattering elements 12 having a refraction index different from the refraction index of the radiation curable resin 11 more strongly scatter light having a short wavelength of a wavelength range of visible light over a wide range depending on the particle diameter (size) of the inner scattering elements 12 (Mie scattering), with little back scattering, the degree of scattering of light depending on the wavelength of the wavelength range of visible light is specified by a scattering cross section in proportion to the particle diameter of the inner scattering elements 12 and a scattering factor.

Figure 5:
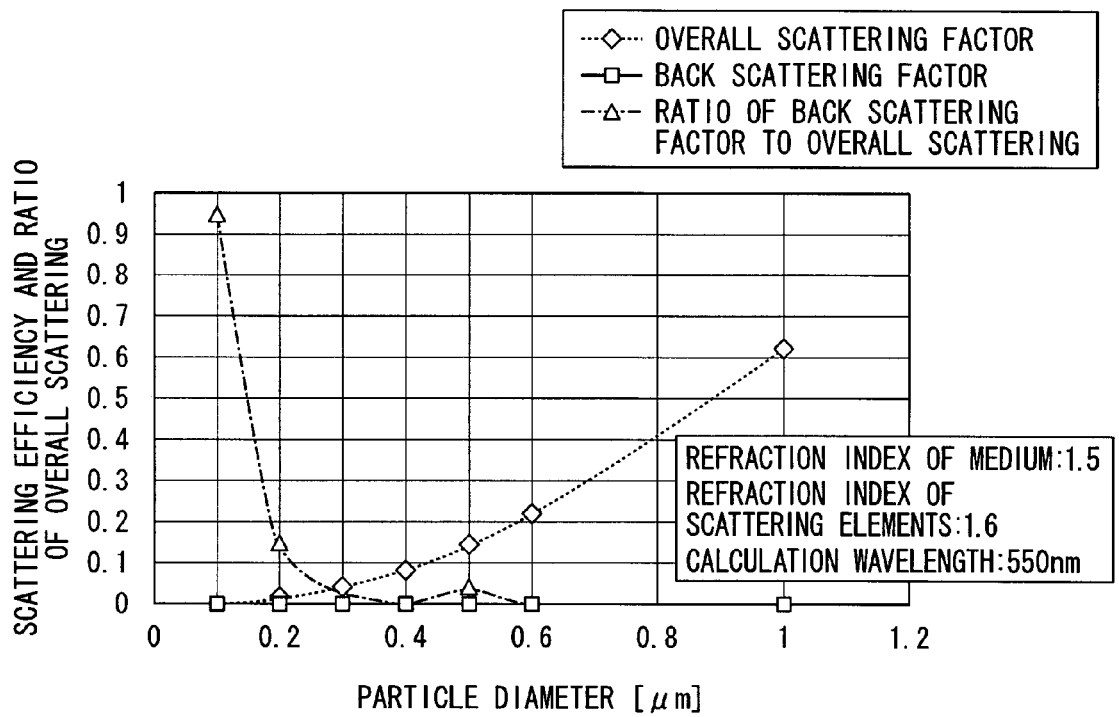
FIG. 5 is a view showing a relationship between particle diameter of inner scattering elements and a scattering efficiency ratio.

FIG. 5 shows a relationship between the particle diameter of the inner scattering elements 12 and a scattering efficiency and an overall scattering ratio when the diffusing layer 9 composed of the radiation curable resin (medium) 11 having a refraction index of 1.5 and the inner scattering elements 12 having a refraction index of 1.6 is irradiated with light having a wavelength of 550 nm. From the graph shown in the figure, it is confirmed that a ratio of back scattering to overall scattering increases suddenly at the particle diameter of 0.1 μm to 0.2 μm. If the diffusing layer 9 contains lots of inner scattering elements having such a small particle diameter which increases the back scattering suddenly, contrast of an image is lowered.

Figure 6:
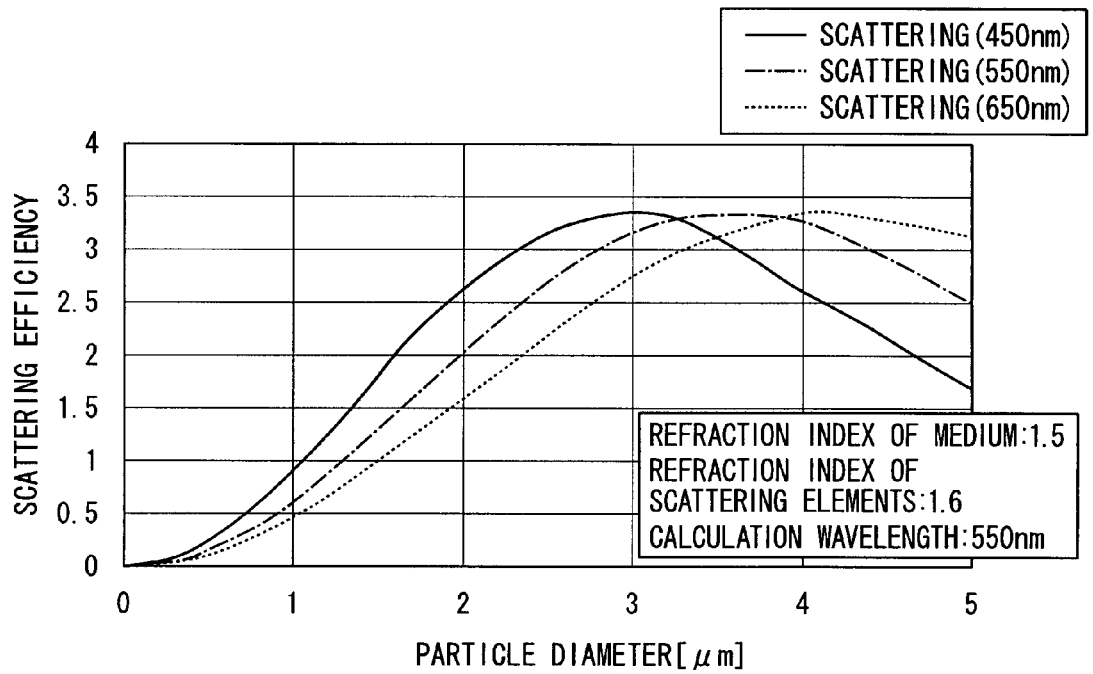
FIG. 6 is a view showing a relationship between particle diameter of inner scattering elements and a scattering efficiency for different wavelengths of light.

FIG. 6 shows a relationship between the particle diameter of the inner scattering elements 12 and a scattering efficiency for different wavelengths of light. From the graph shown in the figure, it is confirmed that light is scattered over the entire range of wavelength rather than a specified short wavelength when the particle diameter is more than 3 μm. If the diffusing layer 9 contains lots of inner scattering elements 12 having such a large particle diameter of more than 3 μm, luminance or sharpness is lowered.

Figure 7:
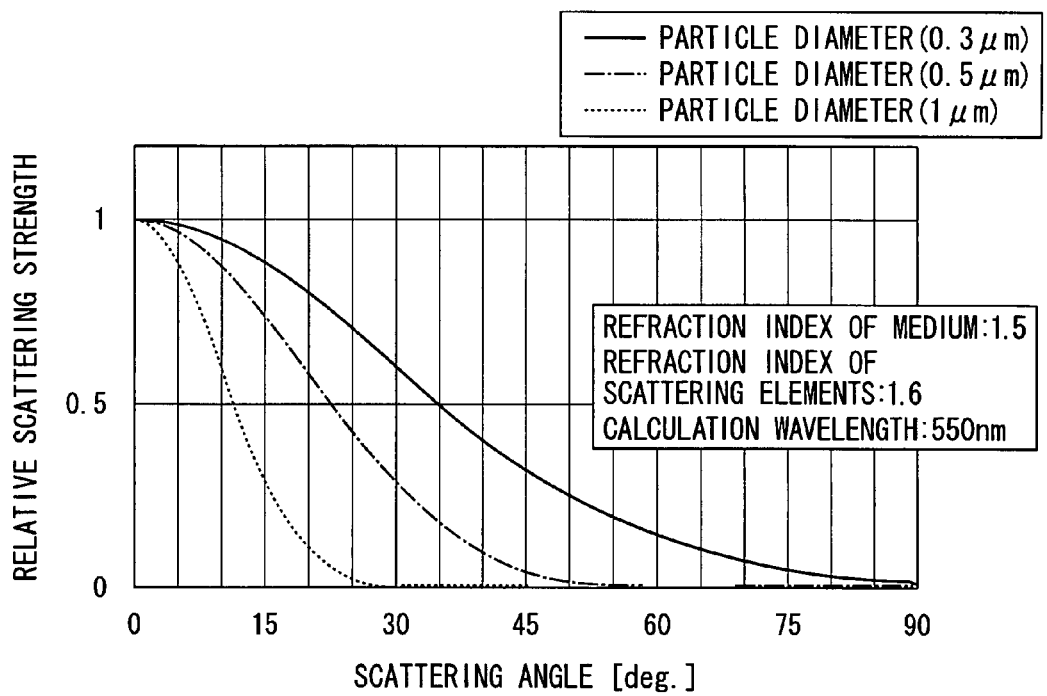
FIG. 7 is a view showing a relationship between a scattering angle and relative scattering strength for inner scattering elements having different particle diameters.

FIG. 7 shows a relationship between a scattering angle and relative scattering strength for the inner scattering elements 12 having different particle diameters. From the graph shown in the figure, it is confirmed that a larger particle diameter gives a smaller scattering angle, and good gradations and good color correction are obtained when the diffusing layer 9 contains lots of inner scattering elements 12 having a small particle diameter.

Accordingly, the inner scattering elements 12 having a particle diameter (size) of 0.5 to 3.0 μm can strongly scatter light at a short wavelength region more reliably and make a scattering angle large, which contributes to good gradations and good color correction. The particle diameter is a median diameter and is expressed as a Heywood diameter, which is a projected area equivalent diameter measured by a microscope.

Figure 8:
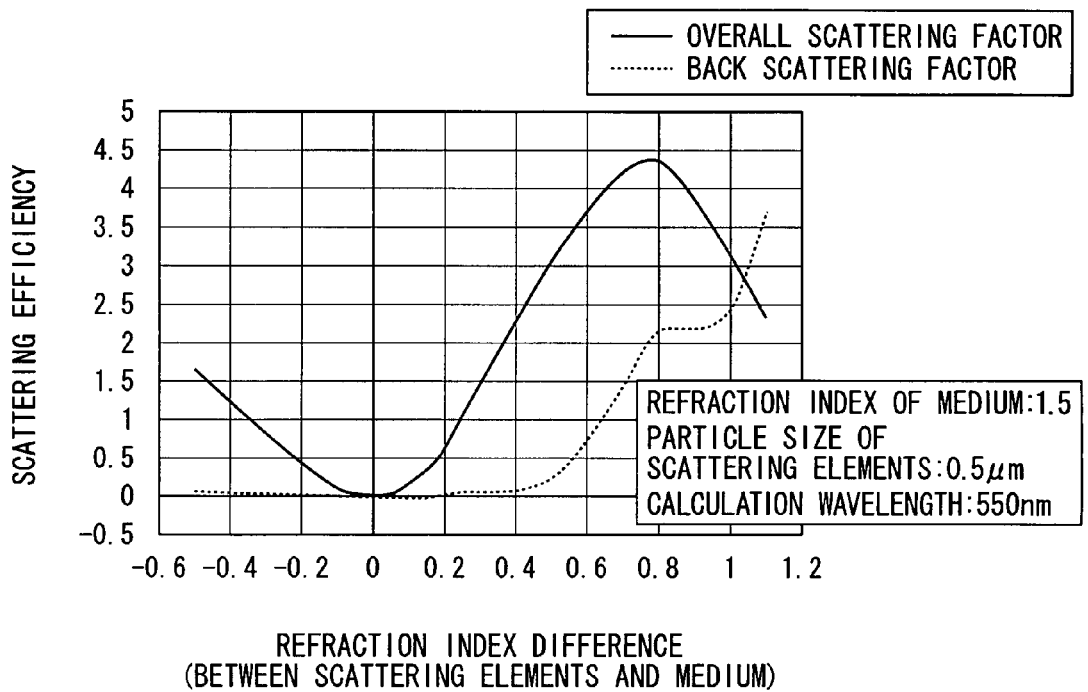
FIG. 8 is a view showing a relationship between a refraction index difference between inner scattering elements and a medium, and a scattering efficiency.

FIG. 8 shows a relationship between a refraction index difference between the inner scattering elements 12 having a particle diameter of 0.5 μm and the medium 11, and a scattering efficiency. From the graph shown in the figure, it is confirmed that a scattering efficiency depending on an overall scattering factor greatly decreases if the refraction index difference is equal to or less than 0.05, and a scattering efficiency depending on a back scattering factor increases suddenly if the refraction index difference is equal to or more than 0.6. On this account, a light diffusion effect by the diffusing layer 9 can not be obtained if the refraction index difference is equal to or less than 0.05, and contrast of an image is lowered if the refraction index difference is equal to or more than 0.6. Accordingly, when the refraction index difference between the inner scattering elements 12 and the medium 11 is in a range from 0.05 to 0.6, it is possible to extend a view angle more reliably and suppress the contrast of an image from being lowered.

Second Embodiment

Figure 9:
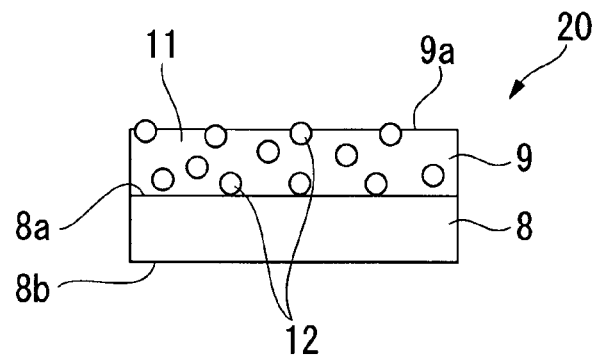
FIG. 9 is a view showing an optical device according to a second embodiment of the present invention.

An optical film 20 according to a second embodiment includes a diffusing layer 9 in which some of inner scattering elements 12 project from a surface 9a (a front surface (foreside) of a polarizing plate and a liquid crystal display apparatus) of the diffusing layer 9, as shown in FIG. 9. Accordingly, the surface 9a of the diffusing layer 9 is formed to be uneven.

In the optical film 20 as configured above, for example, when the surface 9a of the diffusing layer 9 is irradiated with external light, the external light is reflected from the surface 9a by the unevenness of the surface 9a, thereby preventing the visibility of light which passes through the first polarizing plate 4 and the optical film 20 from being deteriorated. In other words, it is possible to significantly improve antiglare by making the surface 9a of the diffusing layer 9 uneven.

Figure 10:
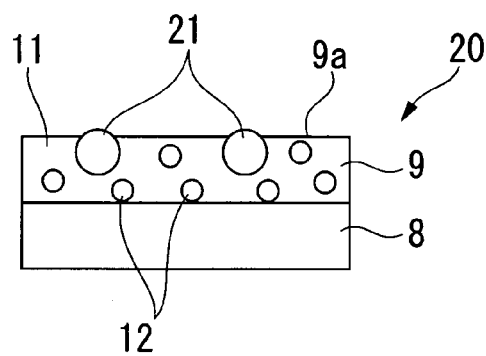
FIG. 10 is a view showing an optical device according to a modification of the second embodiment of the present invention.

In addition to projecting some of the inner scattering elements 12 from the surface 9a of the diffusing layer 9, for example, unevenness forming particles 21 which project from the surface 9a of the diffusing layer 9 to make the surface 9a uneven may be further mixed with the inner scattering elements 12 in the diffusing layer 9, as shown in FIG. 10. The unevenness forming particles 21 may be, for example, inorganic powders such as powdered glass, glass beads, pulverized glass fiber, titanium oxide, calcium carbonate, silicon dioxide (silica), aluminum oxide, various kinds of clays and the like, or resin powders such as crosslinking or non-crosslinking organic fine particles composed of various kinds of polymers such as polymethylmetacrylate (PMMA), polyurethane, melamine resin and the like. The unevenness forming particles 21 may be hollow particles, porous particles, composite particles, etc., and may be composed of two or more kinds of particles. The content of the unevenness forming particles 21 mixed into the diffusing layer 9 is preferably 2 wt % to 50 wt %, more preferably 5 wt % to 25 wt % for transparent resin (medium 11) of 100 wt %. Such unevenness forming particles 21 contributes to the improvement of antiglare properties like in the first embodiment. By projecting the inner scattering elements 12 along with the unevenness forming particles 21 from the surface 9a, the surface 9a may be formed to be uneven in combination of the inner scattering elements 12 and the unevenness forming particles 21.

Figure 11:
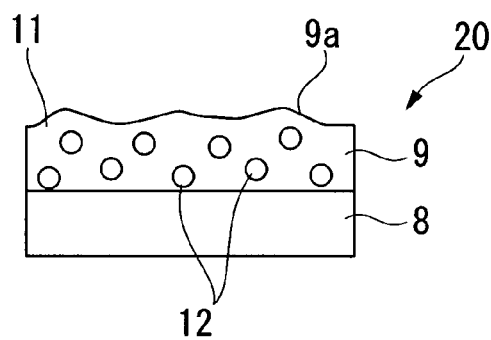
FIG. 11 is a view showing an optical device according to a modification of the second embodiment of the present invention.

In addition to projecting the inner scattering elements 12 and the unevenness forming particles 21 from the surface 9a to improve antiglare, the surface 9a of the diffusing layer 9 may be formed to be uneven by subjecting a surface of the optical film 20 (the surface 9a of the diffusing layer 9) to an embossing treatment, as shown in FIG. 11. In other words, it is possible to improve antiglare by making the surface 9a uneven through an antiglare process.

EXAMPLE 1

Hereinafter, Example 1 of the present invention will be described in detail. However, the present invention is not limited to Example 1.

In Example 1, a coating fluid is manufactured by mixing a mixture solution [made by adding SEAHOSTAR P100 of a refraction index of 1.42 (available from Nippon Shokubai Co., Ltd.) (inner scattering elements 12) in methyethylketone by 30 wt %] with another mixture solution [made by adding BYK-P105 (available from BYK Japan KK) in a clear resin solution (SEIKA-BEAM EXF37T available from Dainichiseika Color & Chemicals Mfg. Co., Ltd.) of a radiation curable resin 11 with a refraction index of 1.52 to 1.53 and a weight ratio (wt %) of 0.07:2] with a weight ratio (wt %) of 1:2. Then, the diffusing layer 9 and the optical film 10 are formed by applying the manufactured coating fluid on a TAC film (80 μm in thickness) (available from FUJIFILM Corporation) using an applicator of Gap 75 μm, heating the applied coating fluid to volatilize a solvent contained in the coating fluid, and irradiating the coating fluid with ultraviolet rays of about 500 mJ/cm$^2$ to cure the coating fluid. At this time, content of the inner scattering elements 12 in the diffusing layer 9 is about 23 wt %. Pencil hardness (specified by ISO/DIS 15184) of the formed optical film 10 is 3H. It is confirmed that this optical film 10 has antiglare properties.

The chromaticity depending on the view angle when the optical film 10 (optical device) is installed in the liquid crystal display apparatus 100A is compared with the chromaticity depending on the view angle when the optical film 10 is not installed in the liquid crystal display apparatus 100A. That is, when the liquid crystal display apparatus 100A displays color near eight test colors specified in CIE (Commission Internationale de l'Eclairage) 1974, as a test color, a chromaticity coordinate of CIE1976UCS observed in the front surface (foreside) 100A1 of the liquid crystal display apparatus 100A and a chromaticity coordinate observed at an observation angle θ of ±60 degrees in horizontal and vertical directions of a screen of the liquid crystal display apparatus 100A when a direction perpendicular to the front surface 100A1 is assumed to be 0 degree are measured, and then, chrominance Δu'v' is obtained from these measured chromaticity coordinates. This experiment demonstrates predominance of the optical film 10, the first polarizing plate 4 having the optical film 10, and the liquid crystal display apparatus 100A according to Example 1.

Specifically, with the optical film 10 attached to the front surface (foreside, top surface) 100A1 of a VA type liquid crystal TV (LC-20SA-S available from Sharp Corporation) 100A, it is confirmed that good scattering properties are obtained and the chrominance Δu'v' is 0.05 to suppress color variation. On the other hand, without the optical film 10 attached to the front surface 100A1, the chrominance Δu'v' is 0.10. In addition, with the optical film 10 attached to the front surface 100A1, luminance is lowered by 13%.

Accordingly, when the optical film 10 of the present invention is attached to the liquid crystal display apparatus 100A, it is demonstrated that it is possible to obtain a liquid crystal display apparatus without color variation depending on a view angle (viewing angle) while suppressing font luminance from being lowered.

Third Embodiment

Hereinafter, a liquid crystal image display apparatus according to a third embodiment of the present invention will be described with reference to FIGS. 12 to 21. The third embodiment relates to a liquid crystal image display apparatus, such as a liquid crystal TV, having a vertical-aligned type liquid crystal panel in which liquid crystal molecules are vertically aligned, and more particularly, to a liquid crystal image display apparatus which suppresses color variation depending on the view angle.

Figure 12:
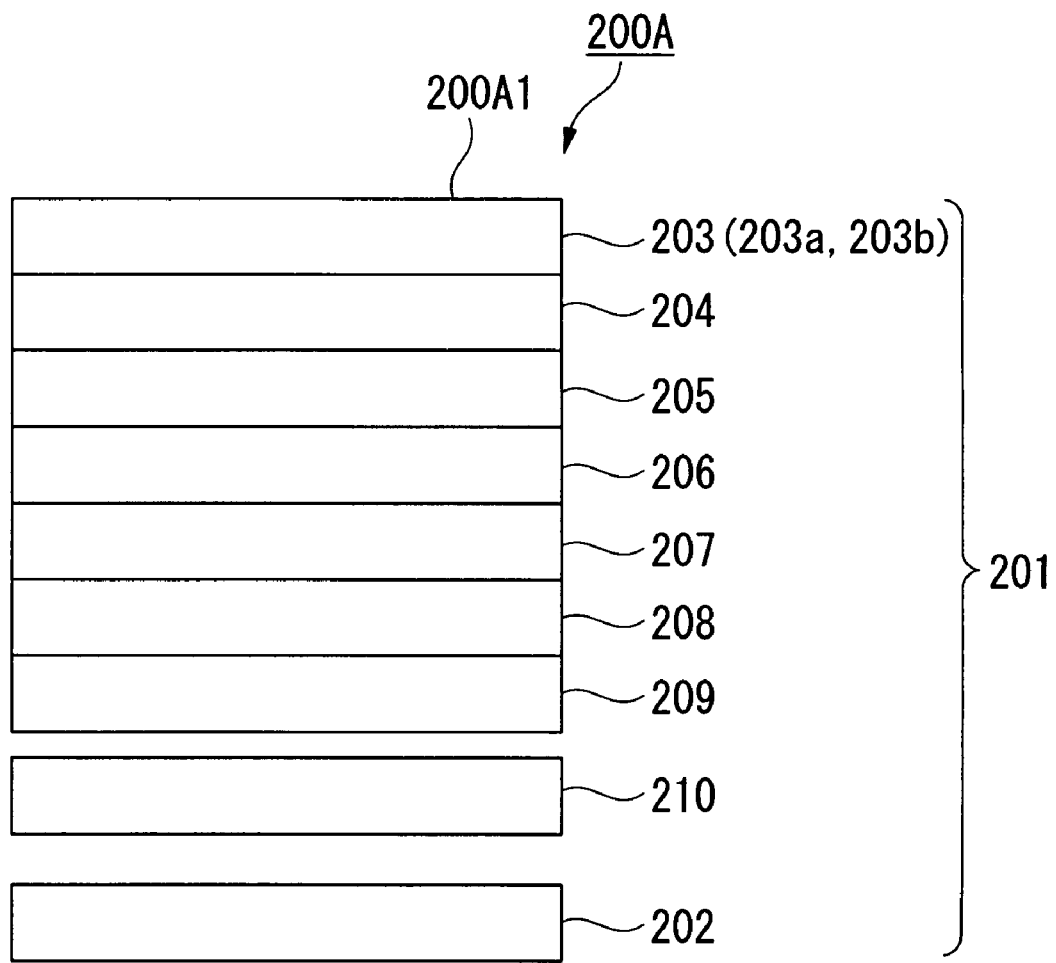
FIG. 12 is a view showing a liquid crystal image display apparatus according to the second embodiment of the present invention.

As shown in FIG. 12, a liquid crystal image display apparatus 200A according to the present embodiment includes a liquid crystal panel 201, and a backlight (backlight unit) 202 which provides light to the liquid crystal panel 201. The liquid crystal panel 201 includes a diffuser 203 having a diffusing layer 203a containing inner scattering elements which scatter visible light (Mie scattering), an analyzer 204, a first biaxial phase difference optical device 205, a vertical-aligned type liquid crystal cell 206, a second biaxial phase difference optical device 207, a polarizer 208, a polarizer protective film 209, which are laminated in order when viewed from a front surface 200A1 of the liquid crystal image display apparatus 200A which displays an image, and a brightness enhancement film 210 interposed between the polarizer 208 and the backlight 202.

The diffuser 203 includes a transparent plastic-based film 203b, such as a triacetyl cellulose (TAC) film, a polyethylene terephthalate (PET) film, a cycloolefin film or the like, and the diffusing layer 203a which is laminated on the transparent plastic-based film 203b and includes a radiation curable resin and inner scattering elements dispersed in the radiation curable resin. Here, the diffusing layer 203a is applied on the plastic-based film 203b by a thickness of, preferably 3 to 50 μm, more preferably 3 to 30 μm. The inner scattering elements have a refraction index different from a refraction index of the radiation curable resin. When the inner scattering elements are dispersed in the radiation curable resin as a binder, a plurality of fine regions which are composed of the inner scattering elements and have different refraction indexes are formed in the diffusing layer 203a. The inner scattering elements scatter light of a short wavelength of the wavelength range of visible light, which is emitted from the backlight 202 and passes through the brightness enhancement film 210, the polarizer protective film 209, the polarizer 208, the second biaxial phase difference optical device 207, the vertical-aligned type liquid crystal cell 206, the first biaxial phase difference optical device 205 and the analyzer 204, more strongly (selectively) depending on the particle diameter of the inner scattering elements (Mie scattering). The inner scattering elements may be dispersed in the radiation curable resin (the diffusing layer 203a) either uniformly or non-uniformly.

The radiation curable resin is preferably a resin having acrylate functional groups, more preferably polyesteracrylate or urethane(meth)acrylate. Polyesteracrylate is preferably oligomeracrylate or metaacrylate of polyester polyols (hereinafter, "acrylate and/or metaacrylate" will be referred to as "(meth)acrylate") or a mixture thereof.

Urethaneacrylate is made by acrylating oligomer composed of polyol compound and diisocyanate compound. In addition, urethaneacrylate may be vinyl acetate resin, epoxy (meth)acrylate, phenoxy resin, butyral resin, silicon(meth)acrylate, styrene resin, cellulose derivatives, alicyclic olefin resin, etc.

Monomer of acrylate preferably includes methyl(meth)acrylate, ethyl(meth)acrylate, butyl(meth)acrylate, 2-ethylhexyl(meth)acrylate, methoxyethyl(meth)acrylate, butoxyethyl(meth)acrylate, phenyl(meth)acrylate, etc.

Acrylate may be used in combination with multi functional monomer. For example, the multi functional monomer may include trimethylolpropanetri(meth)acrylate, hexanediol (meth)acrylate, tripropyleneglycoldi(meth)acrylate, diethyleneglycoldi(meth)acrylate, pentaerythritoltri(meth)acrylate, dipentaerythritolhexa(meth)acrylate, 1,6-hexanedioldi(meth)acrylate, neopentylglycoldi(meth)acrylate, methyl (meth)acrylate, ethyl(meth)acrylate, butyl(meth)acrylate, 2-ethylhexyl(meth)acrylate, methoxyethyl(meth)acrylate, butoxyethyl(meth)acrylate, phenyl(meth)acrylate, etc.

Examples of polyesteroligomer include polysebaciatepolyol and polyadipatepolyol, which is a condensate of: sebacic acid and glycol or triol; and adipic acid and glycol (ethyleneglycol, polyethyleneglycol, propyleneglycol, polypropyleneglycol, butyleneglycol, polybutyleneglycol, etc.) or triol (glycerin, trimethylolepropane, etc.).

A polymerization initiator(I) may be mixed into the radiation curable resin in order to increase polymerization of the radiation curable resin efficiently. The polymerization initiator(I) may be a compound which generates radicals when activation energy is supplied. For example, the polymerization initiator(I) may include 1-hydroxycyclohexylphenylketone, 2-hydroxy-2-methyl-1-phenylpropane-1-on, 2-methyl[4-(methyltio)phenyl]-2-morpholinopropane-1-on, 2,2-dimethoxy-1,2-diphenylethane-1-on, benzophenone, 1-[4-(2-hydroxyethoxy)phenyl]-2-hydroxy-2-methyl-1-propane-1-on, 2-benzil-2-dimethylamino-1-(4-morpholinophenyl) butane-1-on, bis(2,6-dimethoxybenzoyl)-2,4,4-trimethylephentylphosphineoxide, etc.

Content of the polymerization initiator(I) is 0.1 to 10 wt %, preferably 1 to 7 wt %, more preferably 1 to 5 wt % for the radiation curable resin of 100 wt %.

The solvent suitable for polymer may be used and may include, for example, ketones such as methylethylketone (MEK), acetone, methylisobutylketone or the like, esters such as methyl acetate, ethyl acetate, butyl acetate or the like, aromatic compounds such as toluene, xylene or the like, ethers such as diethylether, tetrahydrofuran or the like, alcohols such as methanol, ethanol, isopropyl alcohol (IPA) or the like. One or more kinds of the radiation curable resin, raw monomer, and the solvent may be used respectively.

In the present embodiment, the inner scattering elements may be, for example, silica particles, styrene particles, melamine particles, acryl particles, alumina particles, titanium oxide particles, hollow particles thereof, composite particles thereof, etc. These particles may be used either solely in a monodisperse form or in combination. Content of the inner scattering elements is preferably 3 wt % to 50 wt % of the diffusing layer 203a.

The inner scattering elements having a refractive index different from a refractive index of the radiation curable resin more strongly scatter light having a short wavelength of the wavelength range of visible light over a wide range depending on the particle diameter of the inner scattering elements (Mie scattering), with little back scattering. The degree of scattering of light by the inner scattering elements depending on wavelength of the wavelength range of visible light is specified by a scattering cross section, that is to say, specified in proportion to the particle diameter of the inner scattering elements and a scattering factor.

FIG. 5 shows a relationship between the particle diameter of the inner scattering elements and a scattering efficiency and an overall scattering ratio when the diffusing layer 203a composed of the radiation curable resin (medium) having a refraction index of 1.5 and the inner scattering elements having a refraction index of 1.6 is irradiated with light having a wavelength of 550 nm. From the graph shown in the figure, it is confirmed that a ratio of back scattering to overall scattering increases suddenly at the particle diameter of 0.1 µm to 0.2 µm. If the diffusing layer contains lots of inner scattering elements having such a small particle diameter which increases the back scattering suddenly, contrast of an image is lowered.

FIG. 6 shows a relationship between the particle diameter of the inner scattering elements and a scattering efficiency for different wavelengths of light. From the graph shown in the figure, it is confirmed that light is scattered over the entire range of wavelength rather than a specified short wavelength when the particle diameter is more than 3 µm. If the diffusing layer contains lots of inner scattering elements having such a large particle diameter of more than 3 µm, luminance or sharpness is lowered.

FIG. 7 shows a relationship between a scattering angle and relative scattering strength for the inner scattering elements having different particle diameters. From the graph shown in the figure, it is confirmed that a larger particle diameter gives a smaller scattering angle, and good gradations and good color correction are obtained when the diffusing layer contains lots of inner scattering elements having a small particle diameter.

Accordingly, it is preferable that the particle diameter of the inner scattering elements is 0.5 to 3.0 µm to strongly scatter light at a short wavelength region and make the scattering angle large, which contributes to good gradations and good color correction. The particle diameter is a median diameter and is expressed as a Heywood diameter, which is a projected area equivalent diameter measured by a microscope.

FIG. 8 shows a relationship between the refraction index difference between the inner scattering elements having a particle diameter of 0.5 µm and the medium, and the scattering efficiency. From the graph shown in the figure, it is confirmed that an overall scattering factor decreases greatly if the refraction index difference is equal to or less than 0.05 and the scattering efficiency depending on a back scattering factor increases suddenly if the refraction index difference is equal to or more than 0.6. Because of this, a light diffusion effect by the diffusing layer 203a can not be obtained if the refraction index difference is equal to or less than 0.05, and the contrast of an image is lowered if the refraction index difference is equal to or more than 0.6. Accordingly, it is preferable to set the refraction index difference between the inner scattering elements and the medium to be in the range of 0.05 to 0.6 to extend the viewing angle and suppress the contrast of an image from being lowered.

The diffuser 203 having the diffusing layer 203a including the radiation curable resin and the inner scattering elements reduces color variation and a rise in black level of the liquid crystal panel 201 and suppresses a glare, by scattering blue light having a short wavelength of visible light.

Figure 13:
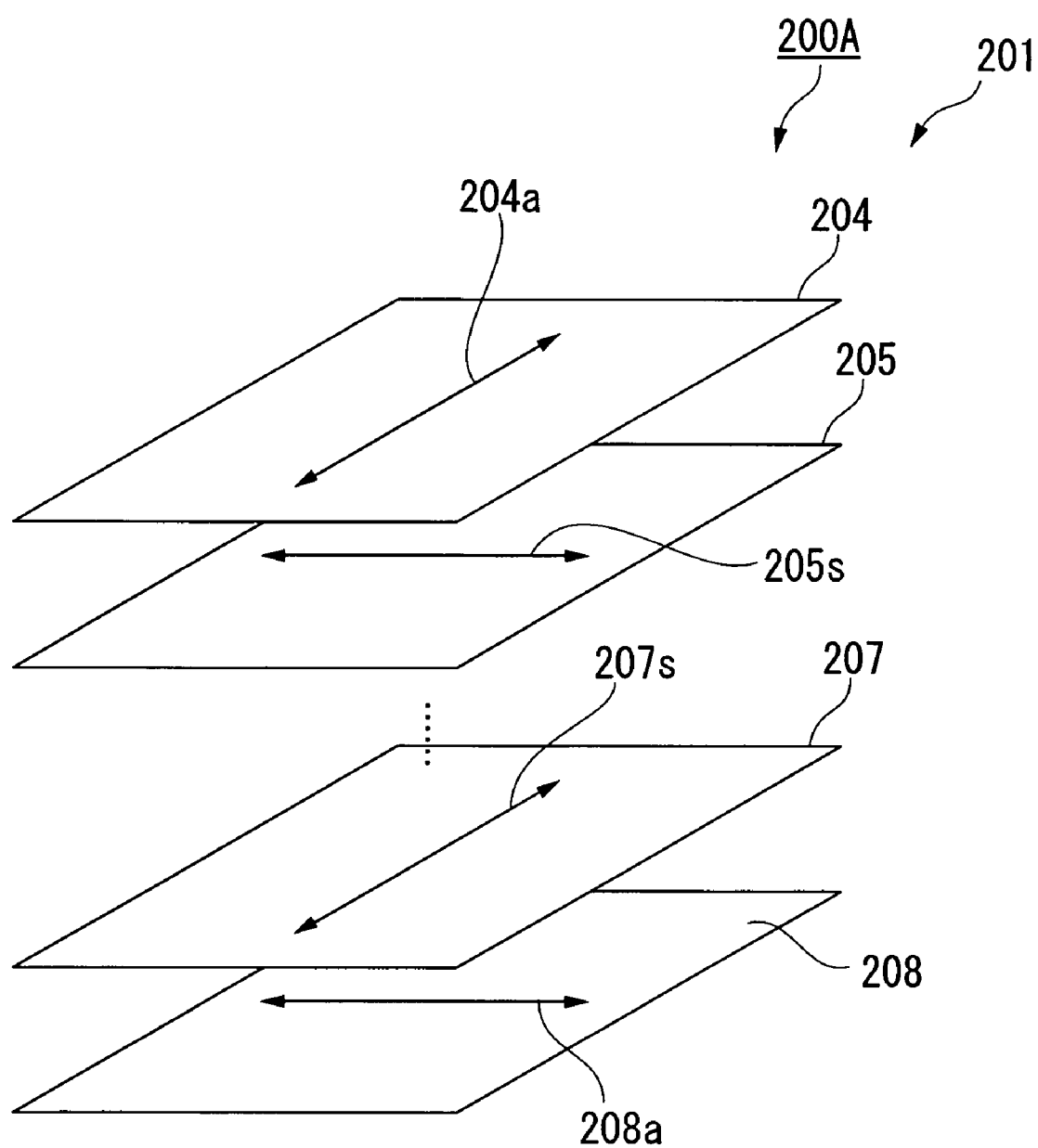
FIG. 13 is a perspective view showing arrangement of an analyzer, a polarizer, and first and second biaxial phase difference optical devices of a liquid crystal image display apparatus according to a third embodiment of the present invention.

As shown in FIG. 13, the analyzer 204 and the polarizer 208 are arranged in cross-Nicol.

Figure 14:
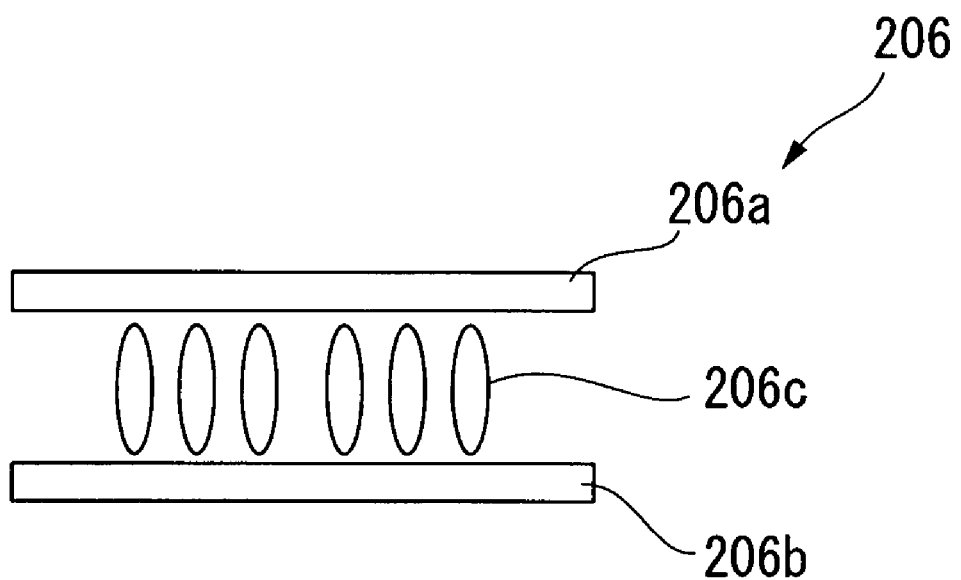
FIG. 14 is a view showing a state in which a voltage is not applied to a vertical-aligned liquid crystal cell included in the liquid crystal image display apparatus according to the third embodiment of the present invention.
Figure 15:
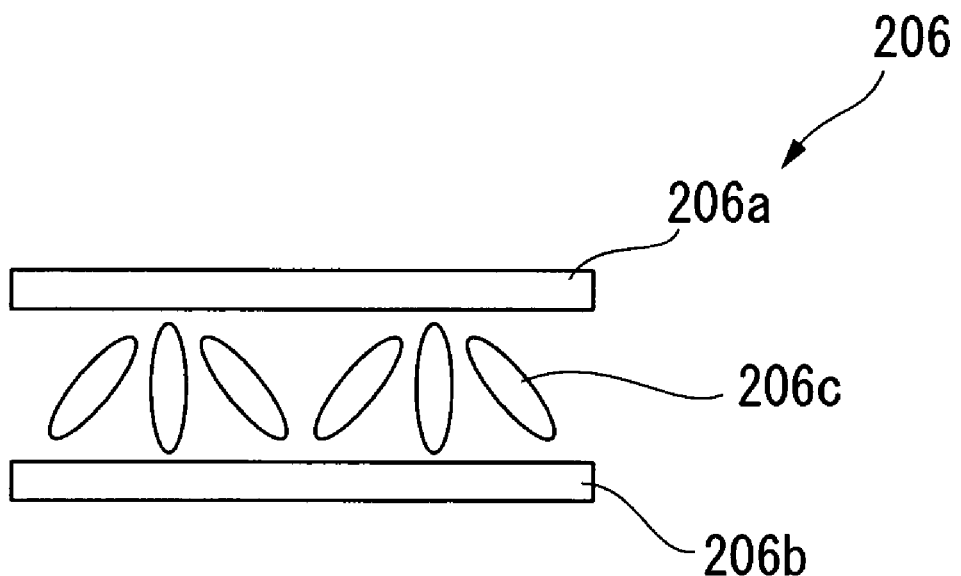
FIG. 15 is a view showing a state in which a voltage is applied to a vertical-aligned liquid crystal cell included in the liquid crystal image display apparatus according to the third embodiment of the present invention.

The liquid crystal cell 206 is formed so that one substrate 206a having color filters, the other substrate 206b having thin film transistors (TFTs), and liquid crystal molecules (liquid crystals) 206c put between both substrates 206a and 206b. The liquid crystal molecules 206c are vertically aligned under no application of a voltage, as shown in FIG. 14, and are tilted under application of a voltage, as shown in FIG. 15. In the VA (vertical alignment) state of the liquid crystal molecules 206c as shown in FIG. 14, the liquid crystal cell 206 is in a low transmission state since the polarization is not affected by the liquid crystal cell 206, and a black image is displayed on a screen (front surface 200A1) of the liquid crystal display apparatus 200A.

In the tilt state of the liquid crystal molecules 206c under the application of voltage as shown in FIG. 15, polarization is rotated, and accordingly, a white image is displayed on a screen (front surface 200A1) of the liquid crystal display apparatus 200A. In a state in which the liquid crystal molecules 206c are between the VA state of FIG. 14 and the tilt state of FIG. 15, that is, when the liquid crystal molecules 206c are less tilted than those in the tilt state of FIG. 14, a halftone image is displayed on the screen.

In the present embodiment, the first biaxial phase difference optical device 205 is formed of an analyzer protection/phase difference compensation film or the like, and the second biaxial phase difference optical device 207 is formed of a phase difference compensation/polarizer protection film or the like. The first and second biaxial phase difference optical devices 205 and 207 are formed to have the same phase difference (the same in-plane phase difference $R_0$ and vertical phase difference $R_{th}$). The first biaxial phase difference optical device 205 is arranged in such a manner in which a slow axis 205s is perpendicular to an absorption axis 204a of the analyzer 204 and is parallelized with an absorption axis 208a of the polarizer 208, as shown in FIG. 13. The second biaxial phase difference optical device 207 is arranged in such a manner in which a slow axis 207s is parallelized with the absorption axis 204a of the analyzer 204 and is perpendicular to the absorption axis 208a of the polarizer 208, as shown in FIG. 13.

The backlight 202 is a cold cathode tube. The brightness enhancement film (BEF: a film coated with particles, a film using a phase difference film, etc.) 210 for concentration of light is disposed on the backlight 202, that is, between the backlight 202 and the liquid crystal panel 201. The brightness enhancement film 210 concentrates light which is emitted from the backlight 202, and reduces light in an inclined direction, thereby increasing luminance at the front surface 200A1 of the liquid crystal image display apparatus 200A. Here, "inclined direction" refers to a direction formed at a 45° angle from the absorption axis of the analyzer in a horizontal direction of a screen and formed at 45° to 60° angle from the perpendicular direction in a vertical direction of the screen.

Now, operation and effects of the liquid crystal image display apparatus 200A as constructed above will be described.

Figure 16:
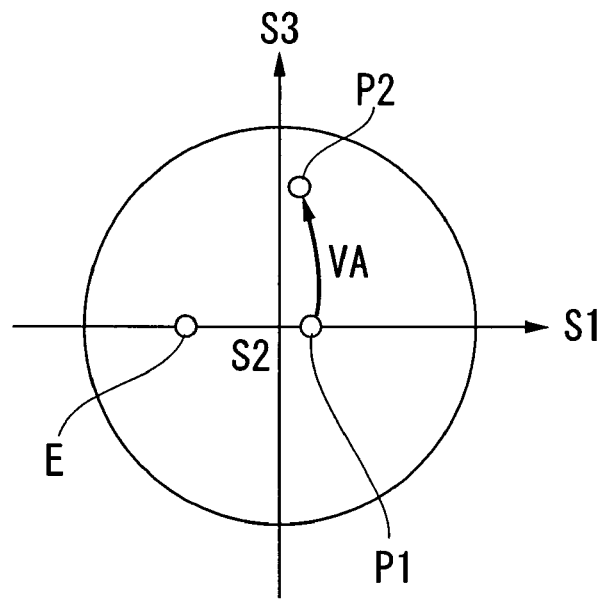
FIG. 16 is a view showing a polarization state when light is incident into a VA type liquid crystal cell in an inclined direction, as behavior on a Poincare sphere.

FIG. 16 shows a polarization state when light is incident into the VA type liquid crystal cell (VA) 206 in an inclined direction, as behavior on a Poincare sphere. In the figure, P1 denotes a polarization state of incident light emitted from the backlight 202 after passing through the brightness enhancement film 210, and P2 denotes a polarization state of the incident light after passing through the liquid crystal cell (VA) 206. E denotes a coordinate of light perpendicular to the analyzer 204 and represents that light leakage occurs in black image display by a difference between P2 and E. As shown in this figure, when the light is incident into the liquid crystal cell 206 in the inclined direction, polarized light is rotated by passing through the liquid crystal cell (VA) 206, and accordingly, the light is varied (deviated) from a state in which the light is perpendicular to the analyzer 204. Accordingly, there occur lots of light leakage and a rise in black level when the screen on which a black image is displayed is viewed in the inclined direction.

Figure 17:
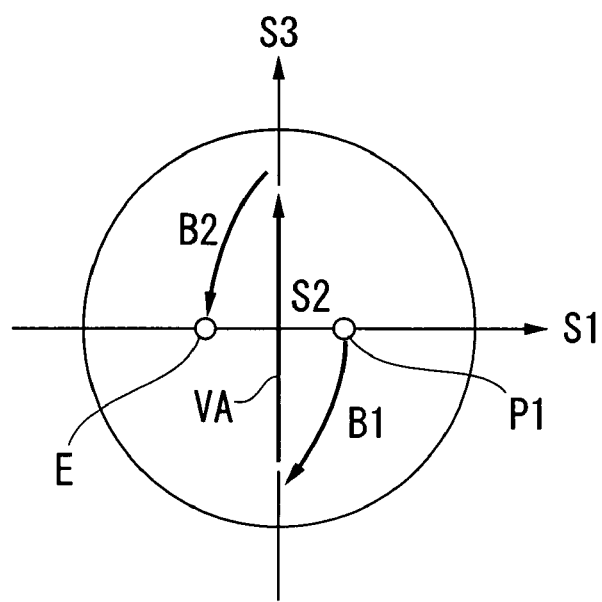
FIG. 17 is a view showing a polarization state when light is incident into a liquid crystal panel having first and second biaxial phase difference optical devices in an inclined direction, as behavior on a Poincare sphere.

On the other hand, as shown in FIG. 17 showing a polarization state as behavior on a Poincare sphere, like FIG. 16, by providing the first biaxial phase difference optical device (B2) 205 and the second biaxial phase difference optical device (B1) 207, the polarization state is compensated such that light is perpendicular to the analyzer 204, thereby reducing light leakage when a black image is displayed. At this time, since the first and second biaxial phase difference optical devices 205 and 207 are biaxial, have the same phase difference, and are arranged so that respective slow axes 205s and 207s are perpendicular (or in parallel) to the absorption axes 204a of the analyzer 204 or the absorption 208a of the polarizer 208, the black light leakage can be reduced. In addition, by making the slow axis 207s of the second biaxial phase difference optical device 207 perpendicular to the absorption axis 208a of the polarizer 208, the black light leakage can be reliably reduced.

Figure 18:
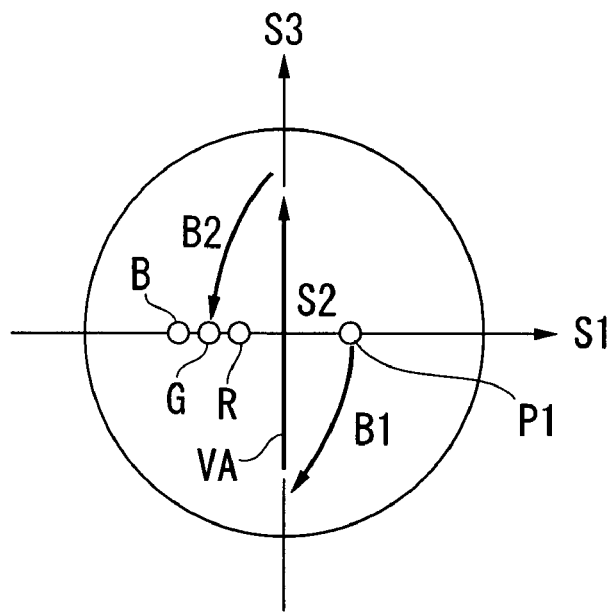
FIG. 18 is a view showing a polarization state when light is incident into a liquid crystal panel having a conventional phase difference film in an inclined direction, as behavior on a Poincare sphere.
Figure 19:
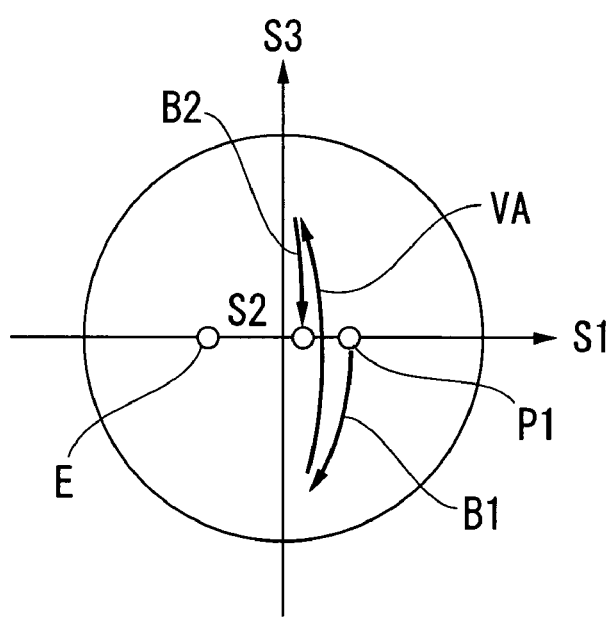
FIG. 19 is a view showing a polarization state when light is incident into a liquid crystal panel having a conventional phase difference film having an adjusted phase difference ratio in an inclined direction, as behavior on a Poincare sphere.

In a phase difference film provided in a conventional liquid crystal panel, assuming that "nx" and "ny" denote refraction indexes along axes "x" and "y", respectively, which are perpendicular to each other and are in parallel to surfaces of the substrates 206a and 206b of the liquid crystal cell, and "nz" denotes a refraction index along an axis "z" perpendicular to the axes "x" and "y", a phase difference ratio Nz (Nz=(nx−nz)/(nx−ny)) is equal to or more than 2, normally 5 to 10. The purpose of setting the phase difference ratio Nz to be equal to or more than 2, or 5 to 10 in the conventional phase difference film is to suppress coloration occurring depending on the wavelength since polarization in the phase difference film is varied depending on the wavelength (three primary colors R, G and B) of transmitted light, as shown in FIG. 18. In other words, as shown in FIG. 19, the coloration is suppressed by weakening a compensation effect of phase difference films (B1 and B2).

Figure 20:
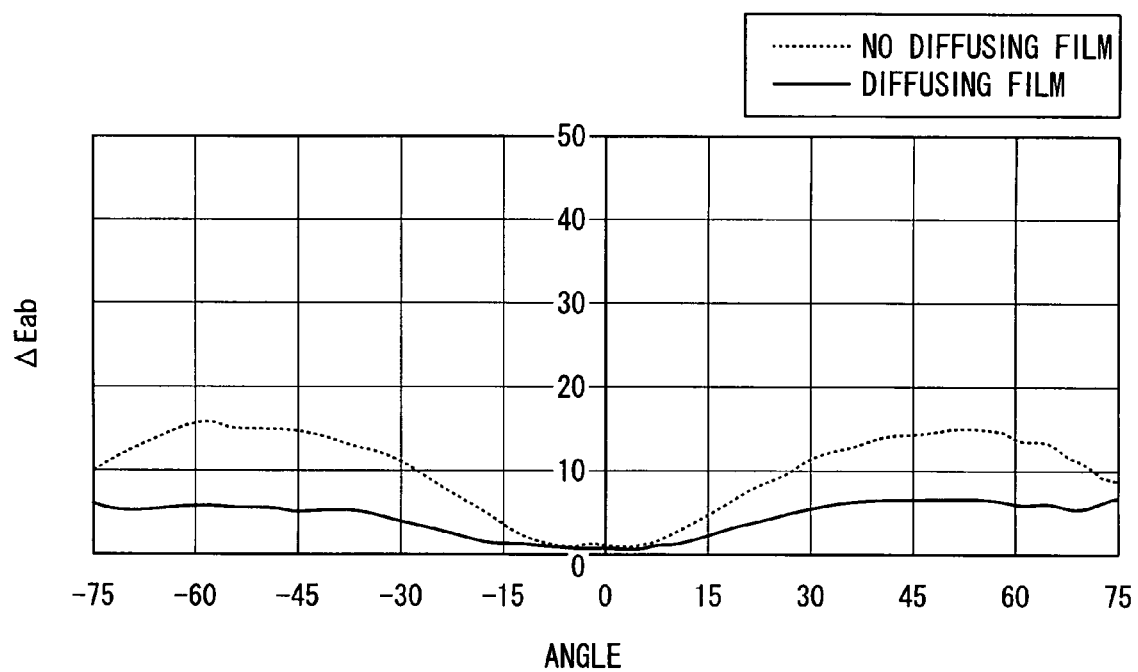
FIG. 20 is a view showing a black color shift state depending on the presence of a diffusing layer of the liquid crystal image display apparatus according to the third embodiment of the present invention.
Figure 21:
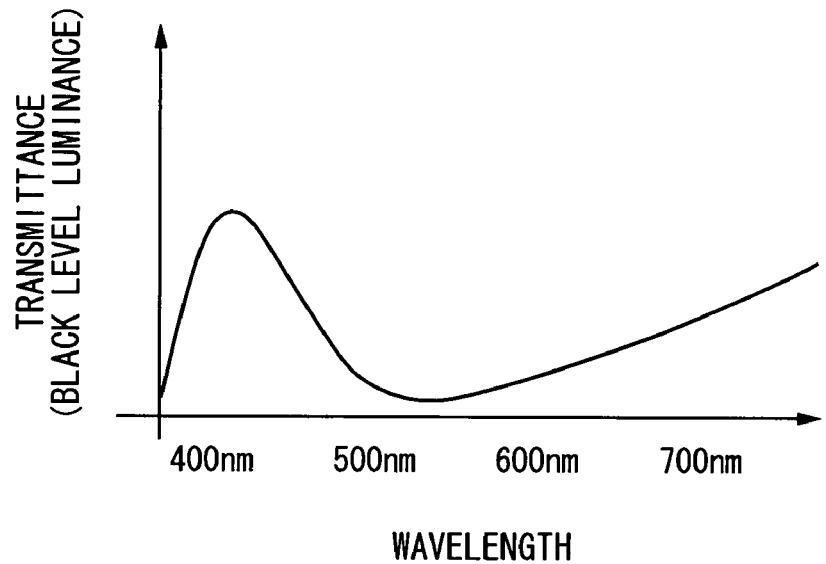
FIG. 21 is a view showing a relationship between wavelength and black level luminance when the liquid crystal image display apparatus according to the third embodiment of the present invention is viewed in an inclined direction under black display.
Figure 22:
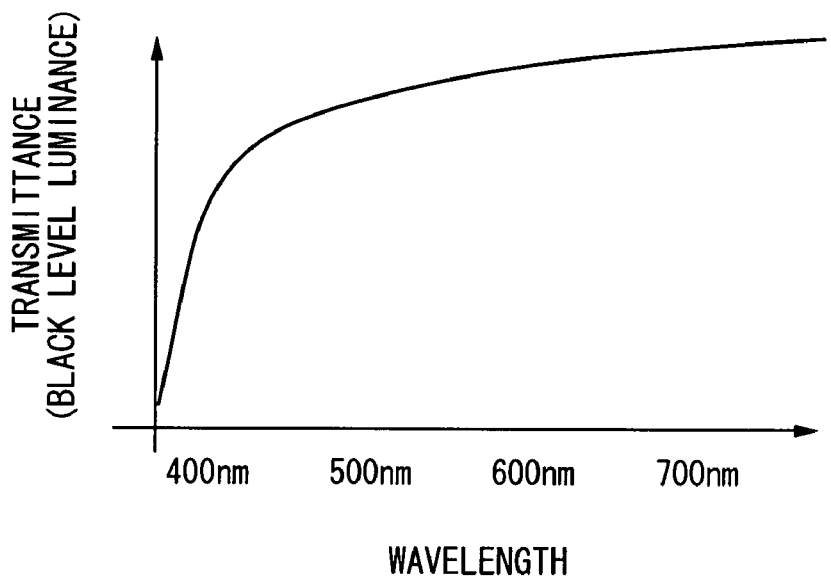
FIG. 22 is a view showing a relationship between wavelength and black level luminance when a conventional liquid crystal image display apparatus is viewed in an inclined direction under black display.

In the liquid crystal image display apparatuses 200A of the present embodiment, by providing the diffuser 203 (diffusing layer 203a, diffusing film) in addition to the first and second biaxial phase difference optical devices 205 and 207, the black color shift depending on the viewing angle is suppressed in a state in which a black color image is displayed in a screen, as shown in FIG. 20. In FIG. 20, the vertical axis represents a Euclid distance ΔEab on a CIE1976 (L*a*b*) space, and the horizontal axis represents an angle when the front direction of a screen (direction perpendicular to the screen) is set as 0°. In the liquid crystal image display apparatus 200A of the present embodiment, spectral transmittance of light in black color image display has the minimum value in a wavelength range of visible light. That is, as shown in FIG. 21, when the spectral transmittance (black level luminance) when viewed in an inclined direction in the black color image display has the minimum value in the wavelength range of 410 nm to 610 nm including a wavelength of 555 nm which is near the center wavelength of visible light and has the highest photopic luminous efficiency function at a 2° view angle (wavelengths 410 nm and 610 nm having half the highest photopic luminous efficiency function), the black level luminance can be particularly lowered. In addition, it is preferable to provide the first and second biaxial phase difference optical devices 205 and 207 giving a phase difference ratio Nz at which black color light leakage is small. It is preferable that the phase difference ratio Nz of the first and second biaxial phase difference optical devices 205 and 207 is near 2, preferably 1.5 to 3. At this time, by making the phase difference of the first biaxial phase difference optical device 205, which is provided at an observer side, and the phase difference of the second biaxial phase difference optical device 207, which is provided in the side opposite to the observer, with the liquid crystal cell 206 interposed between both optical devices 205 and 207, equal to each other (that is, by making an in-plane phase difference $R_0$ and a vertical phase difference $R_{th}$ of the first biaxial phase difference optical device 205 equal to those of the second biaxial phase difference optical device 207, respectively), an effect of phase difference by a wavelength can be suppressed.

Accordingly, in the liquid crystal image display apparatus 200A of the present embodiment, color variation (color shift) when an image is viewed in an inclined direction peculiar to vertical aligned type liquid crystals can be suppressed by means of the diffusing layer 203a disposed at the observer (observation facet, front surface 200A1) side, and light leakage in an inclined direction, which is a drawback of a liquid crystal image display apparatus having the vertical aligned type liquid crystal cell 206, can be reduced by means of the first and second biaxial phase difference optical devices 205 and 207. Accordingly, by suppressing color variation when an image is viewed in an inclined direction, high contrast with a rise in black level suppressed can be obtained.

If a diffusing layer which diffuses (scatters) light over a wide diffusion range is used as the diffusing layer 203a, external light may be also scattered, thereby making a rise in black level conspicuous, particularly when a liquid crystal image display apparatus is used in a bright room. However, in the liquid crystal image display apparatus 200A of the present embodiment, since the diffusing layer 203a has the inner scattering elements causing Mie scattering having wavelength-dependent, a rise in black level can be suppressed with small back scattering, a wide scattering angle and a wide diffusion range.

In addition, since the brightness enhancement film 210 disposed at the side of backlight 202 can concentrate light in the front direction at which quality of the liquid crystal panel 201 is remarkably revealed, the liquid crystal image display apparatus 200A having higher performance can be obtained by diffusing concentrated light by means of the diffusing layer 203a. In general, since the contrast in the front of a liquid crystal panel is high, it is possible to obtain higher contrast overall by concentrating light in a front direction at a backlight side and diffusing the concentrated light in the front side of the liquid crystal panel.

In addition, by increasing the light concentration by the brightness enhancement film 210, since color can be thinned without color bleeding from adjacent liquid crystal cells, it is possible to increase an aperture ratio of black matrixes arranged at one substrate (front glass) 206a of the liquid crystal cell 206. In addition, by concentrating light by means of the brightness enhancement film 210, since a ratio at which light in an inclined direction is scattered by a photo spacer or the like is decreased, an effect of increasing contrast overall can be expected.

The present invention is not limited to the third embodiment, but may be modified in various ways without departing from the spirit of the present invention. For example, although it is illustrated in the present embodiment that the diffusing layer 203a includes the radiation curable resin and the inner scattering elements, the inner scattering elements need not be particulate materials. For example, liquefied inner scattering elements may be mixed with and dispersed in the radiation curable resin, and, with this mixture solution coated and cured on the plastic-based film 203b, fine regions which are composed of the inner scattering elements and have different refraction indexes may be formed in the diffusing layer 203a. In this case, the inner scattering elements need not have a spherical particle shape, and more strongly scatter light having a short wavelength of the wavelength range of visible light depending on the size (average diameter) of the inner scattering elements (Mie scattering). In addition, the medium in which the inner scattering elements are dispersed need not be limited to radiation curable resin, but may be other material if only it is transparent.

In addition, by making the surface (screen, front surface 200A1) of the diffusing layer 203a (diffuser 203) uneven, that is, by subjecting the surface to an antiglare treatment, even when the surface is irradiated with external light, antiglare property which prevents the external light from being reflected may be given to the surface.

Fourth Embodiment

Hereinafter, a diffuser, a diffusing film having the diffuser, a polarizing film and a liquid crystal image display apparatus according to a fourth embodiment of the present invention will be described with reference to FIGS. 23 to 36. The fourth embodiment relates to a liquid crystal display image apparatus, such as a liquid crystal TV, having a VA type liquid crystal panel in which liquid crystal molecules are vertically aligned, and more particularly, to a diffuser which suppresses color variation or gradation variation depending on a view angle, a diffusing film having the diffuser, a polarizing film and a liquid crystal image display apparatus.

Figure 23:
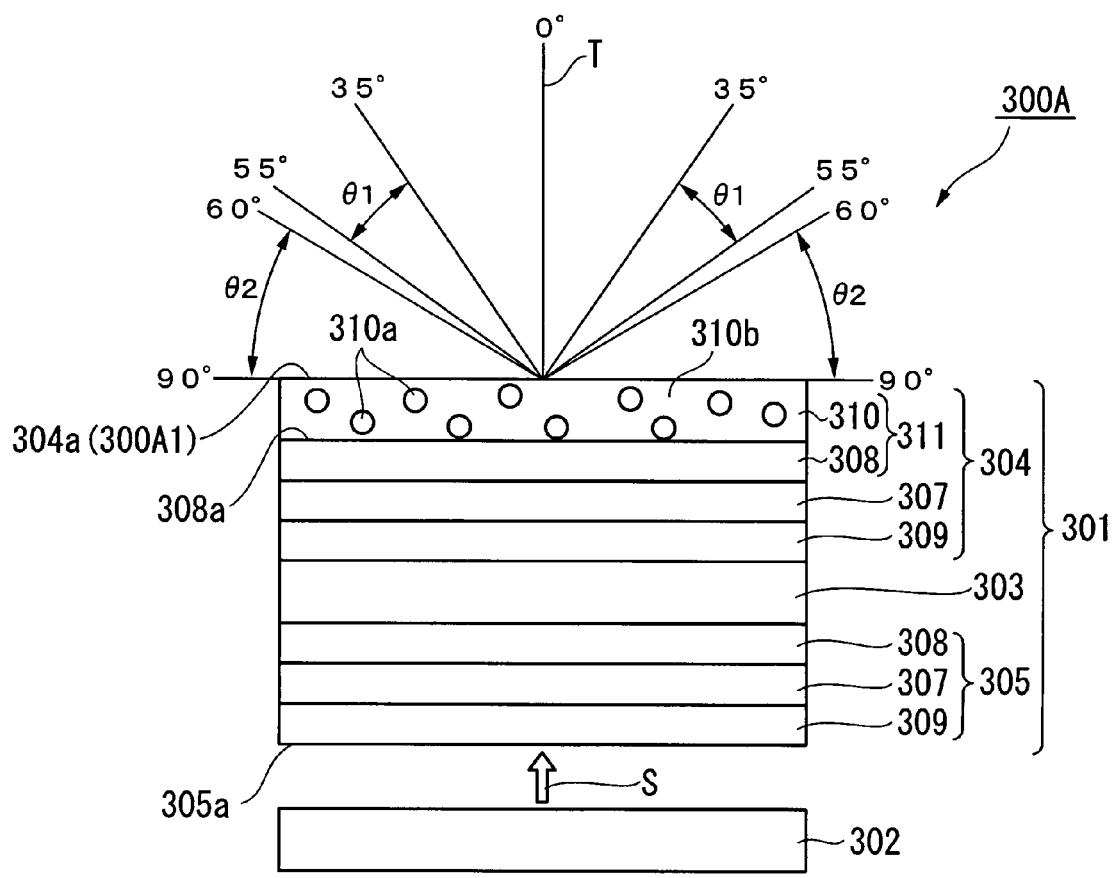
FIG. 23 is a view showing a liquid crystal image display apparatus having a diffuser according to a fourth embodiment of the present invention.

A liquid crystal image display apparatus 300A according to the present embodiment includes a liquid crystal panel 301 and a backlight 302 which provides light (incident light) S to the liquid crystal panel 301. As shown in FIG. 23, the liquid crystal pane 301 includes a first polarizing film 304 and a second polarizing film 305 laminated on both sides of a plate-shaped VA type liquid crystal cell 303, with the liquid crystal cell 303 interposed between both polarizing films 304 and 305. In the liquid crystal display apparatus 300A, a front surface 304a of the first polarizing film 304 of the liquid crystal panel 301 is disposed at a front surface (foreside) 300A1, and the backlight 302, which transmits a parallel light ray S in the order of the second polarizing film 305, the liquid crystal cell 303 and then the first polarizing film 304, is disposed at a rear side 305a of the second polarizing film 305.

Of a pair of first and second polarizing films 304 and 305, the first polarizing film 304 includes a polarizing layer 307 and transparent plastic-based films 308 and 309 with the polarizing layer 307 interposed between the films 308 and 309. A diffuser 310 in which inner scattering elements 310a are dispersed is laminated on a surface 308a of the plastic-based film 308 disposed at the front surface 300A1 of the liquid crystal image display apparatus 300A. In the present embodiment, a diffusing film 311 includes the diffuser 310, which is an element of the first polarizing film 304, and the plastic-based film 308 on which the diffuser 310 is laminated. The second polarizing film 305 includes a polarizing layer 307 and two plastic-based films 308 and 309 with the polarizing layer 307 interposed between the plastic-based films 308 and 309.

The diffuser 310 of the present invention is provided above the polarizing layer 307 interposed between the plastic-based films 308 and 309 at the front surface (foreside) 300A1 of the liquid crystal image apparatus. In the present embodiment, as shown in FIG. 23, since the diffuser 310 is formed on the plastic-based film 308 on the polarizing layer 307, the diffusing film 311 forms a portion of the first polarizing film 304. However, a diffusing film including a plastic-based film and a diffuser formed thereon may be formed separately from a polarizing plate including two plastic-based films and a polarizing layer interposed therebetween, and the polarizing film 304 may be formed by attaching the diffusing film and the polarizing plate each other.

The plastic-based films 308 and 309 of the diffusing film (first and second polarizing films 304 and 305) 311 are, for example, a triacetyl cellulose (TAC) film, a polyethylene terephthalate (PET) film, a cycloolefin film, etc. The plastic-based films 308 and 309 are not particularly limited in material as long as they are transparent plastic-based films.

In the present embodiment, as shown in FIG. 23, the diffuser 310 includes a radiation curable resin (medium) 310b and inner scattering elements (particles) 310a dispersed in the radiation curable resin 310b. The inner scattering elements 310a have a refraction index different from the refraction index of the radiation curable resin 310b. As the inner scattering elements 310a are dispersed in the radiation curable resin 310b, the diffuser 310 has a plurality of fine regions which are constituted by the inner scattering elements 310a and have different refraction indexes. The inner scattering elements 310a scatter the light S which is emitted from the backlight 302 and passes through the diffuser 310 (Mie scattering). The inner scattering elements 310a may be dispersed in the radiation curable resin 310b (the diffuser 310) either uniformly or non-uniformly.

The radiation curable resin 310b is preferably a resin having acrylate functional groups, more preferably polyester-acrylate or urethaneacrylate.

Polyesteracrylate is preferably formed form oligomeracrylate, metaacrylate of polyester polyols (hereinafter, "acrylate and/or metaacrylate" will be referred to as "(meth)acrylate") or a mixture thereof.

Urethaneacrylate is made by acrylating oligomer composed of polyol compound and diisocyanate compound.

Monomer of acrylate preferably includes methyl(meth)acrylate, ethyl(meth)acrylate, butyl(meth)acrylate, 2-ethylhexyl(meth)acrylate, methoxyethyl(meth)acrylate, butoxyethyl(meth)acrylate, phenyl(meth)acrylate, etc.

Acrylate may be used in combination with multi functional monomer. For example, the multi functional monomer may include trimethylolpropanetri(meth)acrylate, hexanediol(meth)acrylate, tripropyleneglycoldi(meth)acrylate, diethyleneglycoldi(meth)acrylate, pentaerythritoltri(meth)acrylate, dipentaerythritolhexa(meth)acrylate, 1,6-hexanedioldi(meth)acrylate, neopentylglycoldi(meth)acrylate, etc.

Examples of polyesteroligomer include polysebaciatepolyol and polyadipatepolyol, which is a condensate of: sebacic acid and glycol or triol; and adipic acid and glycol (ethyleneglycol, polyethyleneglycol, propyleneglycol, polypropyleneglycol, butyleneglycol, polybutyleneglycol, etc.) or triol (glycerin, trimethylolepropane, etc.).

A polymerization initiator(I) may be mixed into the radiation curable resin 310b in order to increase polymerization of the radiation curable resin 310b efficiently. The polymerization initiator(I) may be a compound which generates radicals when activation energy is supplied. For example, the polymerization initiator(I) may include 1-hydroxycyclohexylphenylketone, 2-hydroxy-2-methyl-1-phenylpropane-1-on, 2-methyl[4-(methyltio)phenyl]-2-morpholinopropane-1-on, 2,2-dimethoxy-1,2-diphenylethane-1-on, benzophenone, 1-[4-(2-hydroxyethoxy)phenyl]-2-hydroxy-2-methyl-1-propane-1-on, 2-benzil-2-dimethylamino-1-(4-morpholinophenyl)butane-1-on, bis(2,6-dimethoxybenzoyl)-2,4,4-trimethylephentylphosphineoxide, etc.

The solvent may include, for example, ketones such as methylethylketone, acetone, methylisobutylketone or the like, esters such as methyl acetate, ethyl acetate, butyl acetate or the like, aromatic compounds such as toluene, xylene or the like, ethers such as diethylether, tetrahydrofuran or the like, alcohols such as methanol, ethanol, isopropanol or the like, etc.

In the present embodiment, the inner scattering elements 310a may be, for example, inorganic powders such as powdered glass, glass beads, pulverized glass fiber, titanium oxide, calcium carbonate, silicon dioxide (silica), aluminum oxide, various kinds of clays and the like, or resin powders such as crosslinking or non-crosslinking organic fine particles composed of various kinds of polymers such as polymethylmetacrylate (PMMA), polyurethane, melamine resin and the like. The inner scattering elements 310a may be hollow particles, porous particles, composite particles, etc. In addition, the diffuser 310 may be formed by dispersing two or more kinds of inner scattering elements 310a into the radiation curable resin 310b.

The diffusing film 311 having the diffuser 310 including the radiation curable resin 310b and the inner scattering elements 310a is formed by coating a mixture solution (coating fluid) of the radiation curable resin 310b and the inner scattering elements 310a on the surface 308a of the plastic-based film 308 using coating systems known in the art, such as die coater, spin coater, roll coater, curtain coater, screen print or the like, drying the mixture solution, and curing the dried mixture solution by irradiating the mixture solution with electron beam (EB) or ultraviolet ray.

The diffuser 310 of the present embodiment as formed above has a diffusion characteristic of diffusing equal to or more than 10% of the parallel light ray S with an angle range θ1 of 35° to 55° with respect to the front direction T and diffusing equal to or less than 7% of the parallel light ray S with an angle range θ2 of 60° to 90° with respect to the front direction T, as shown in FIG. 23, when the parallel light ray S incident in a front direction T perpendicular to the front surface 300A1 transmits the diffuser 310.

Now, operation and effects of the diffuser 310 as constructed above, the diffusing film 311 having the diffuser 310, the first polarizing film 304 and the liquid crystal image display apparatus 300A will be described.

The parallel light ray S emitted from the backlight 302 passes through the second polarizing film 305, the liquid crystal cell 303 and the first polarizing film 304 in order and is output to the outside through the front surface 300A1. In general, like the present embodiment, if the diffuser 310 (diffusing film 311) is provided at the front surface 300A1 (observer side) of the liquid crystal panel 301, some of the light S is diffused in a direction inclined with respect to the front direction T and outputted by means of the diffuser 310 of the first polarizing film 304 (diffusing film 311). Accordingly, an image is displayed by averaged light S on a screen of the liquid crystal image apparatus 300A.

However, color variation can be suppressed by a diffuser having a proper diffusion characteristic. Color variation can not be effectively suppressed by only a simple diffuser. That is, diffusers having different diffusion characteristics are provided at the front surface of the liquid crystal panel, one of eight test colors specified in CIE (Commission Internationale de l'Eclairage) 1974 is displayed as a test color on the liquid crystal image display apparatus, and chrominances (degree of color variation) Δu'v' at different observation angles are obtained according to the following Equation 1 from a chromaticity coordinate ($u_0'$, $v_0'$) of CIE1976UCS (Uniform Color Space) observed in the front direction T straight to the front surface 300A1 of the liquid crystal image display apparatus and a chromaticity coordinate ($u_1'$, $v_1'$) of CIE1976UCS observed at an angle (that is, in an inclined direction) with the front direction T.

$$\Delta u'v' = \{(u_1'-u_0')^2 + (v_1'-v_0')^2\}^{0.5}$$ [Equation 1]

From comparison between the obtained chrominances, it is confirmed that a difference of the maximum of 0.09 occurs between the chrominances Δu'v' depending on the difference between diffusion characteristics of the diffuser, that is, large color variation depending on a view angle. That is, it is confirmed that color variation can be effectively suppressed when a diffuser having a proper diffusion characteristic is provided at the front of the liquid crystal panel.

Figure 25:
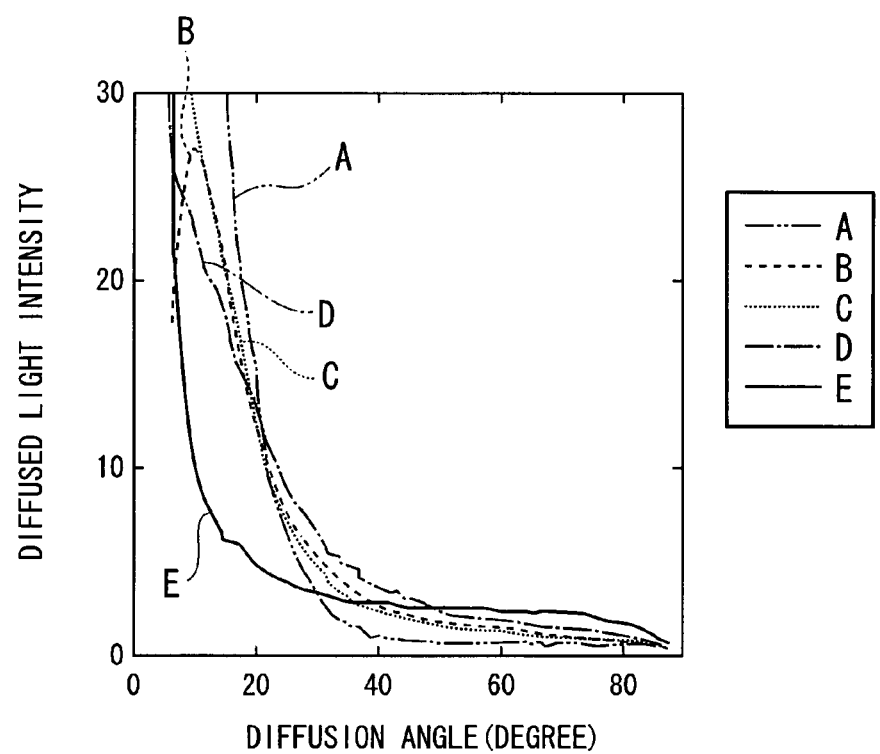
FIG. 25 is a view showing an example of diffused light intensity depending on an angle of light diffused by a diffuser.

FIG. 25 shows a result of diffused light intensity measurement at different observation angles for diffusers A to E which have different diffusion characteristics and are provided at a front side of a liquid crystal panel. Table 1 shows the maximum values of chrominance Δu'v' and front luminance reduction rates for the diffusers A to E. From this result, it is confirmed that the diffuser A having a small diffusion angle of less than 20° of diffused light S can not nearly obtain color variation suppression effects (i.e., chrominance Δu'v' is large). It is confirmed that the chrominance Δu'v' is small in the diffuser D having a diffusion angle smaller than the diffuser E having the widest diffusion range of diffused light. From this, it can be confirmed that it is important for a diffuser to diffuse light not only widely but also strongly in the proper direction in order to suppress color variation. In addition, from the result of FIG. 25 and Table 1, it is admitted that a diffuser having diffused light intensity increasing near a diffusion angle of 45° tends to decrease in chrominance Δu'v'.

TABLE 1

| | | Δu'v' | Front luminance reduction rate (%) |
|---|---|---|---|
| Diffuser | A | 0.069 | 4 |
| | B | 0.046 | 15 |
| | C | 0.046 | 14 |
| | D | 0.03 | 21 |
| | E | 0.036 | 33 |

Figure 26:
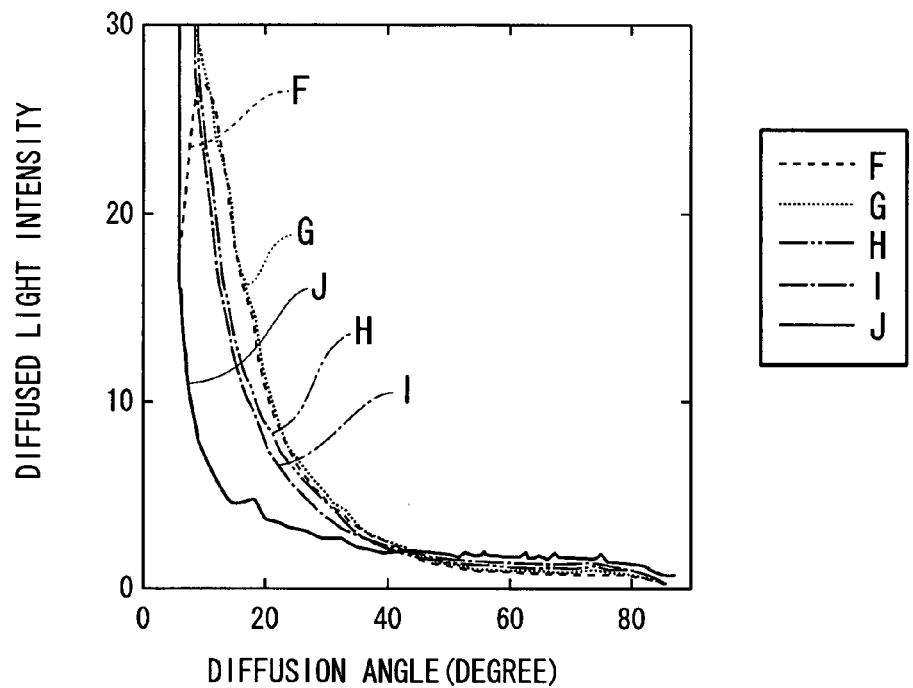
FIG. 26 is a view showing an example of diffused light intensity depending on an angle of light diffused by a diffuser.

FIG. 26 shows a result of diffused light intensity measurement in an inclined direction when the parallel light ray S in the front direction T is incident into diffusers F to J provided at the front side of the liquid crystal panel. The maximum value of chrominance Δu'v' at a diffusion angle of 45° of the diffusers F to J are 0.046 to 0.047, that is, the diffusers F to J can suppress color variation. From this result, although spread of diffused light is greatly varied depending on the diffusers F to J, it is admitted that diffused light intensity near a diffusion angle of 45° is almost equivalent, and also it is confirmed that suppression of color variation depends greatly on the diffused light intensity near the diffusion angle of 45°.

In general, a problem arises in that a diffuser lowers front luminance of a displayed image. Table 2 shows chrominances Δu'v' and front luminance reduction rates for the diffusers A to E shown in FIG. 26. From FIG. 26 and Table 2, it is confirmed that a diffuser having larger diffusion of diffused light gives lower front luminance, and particularly, a diffuser having higher diffused light intensity at equal to or more than a diffusion angle of 60° (the diffuser J having larger diffusion at equal to or more than a diffusion angle of 60°) gives even lower luminance.

TABLE 2

| Diffuser | | Δu'v' | Front luminance reduction rate (%) |
|---|---|---|---|
| Diffuser | F | 0.046 | 15 |
| | G | 0.046 | 14 |
| | H | 0.047 | 17 |
| | I | 0.046 | 21 |
| | J | 0.046 | 26 |

Figure 27:
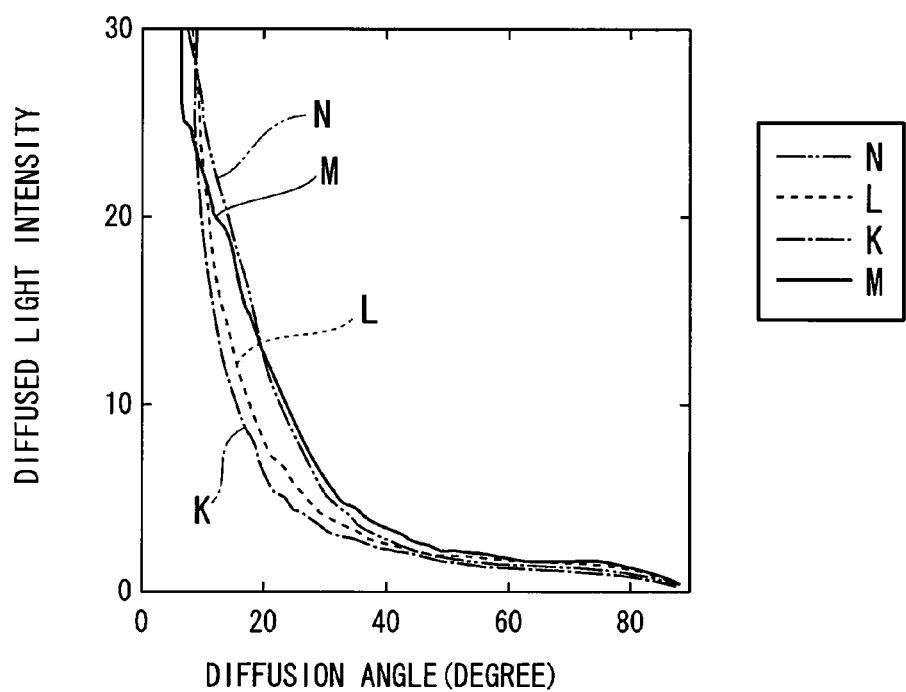
FIG. 27 is a view showing an example of diffused light intensity depending on an angle of light diffused by a diffuser.

FIG. 27 shows a result of measurement of diffused light intensity depending on an observation angle of diffusers K to N having different chrominances Δu'v' and luminance reduction rate of about 20%. From the result, it can be confirmed that diffused light intensities are greatly different near a diffusion angle of 45° while diffused light intensities are about the same at equal to or more than a diffusion angle of 60°. It is also confirmed that luminance reduction depends greatly on diffused light intensity at a diffusion angle of equal to or more than 60°.

Figure 28:
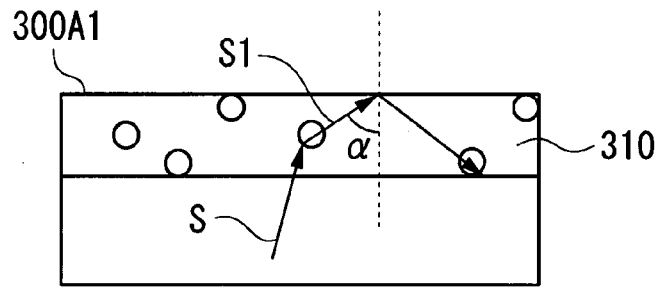
FIG. 28 is a view explaining the cause of front luminance reduction by a diffuser.

It is believed that there are two causes of front luminance reduction by the diffuser. As the first cause, it is believed that the front luminance reduction results from an increase of light S turning around in a horizontal direction from the light S concentrated in the front direction T when the diffusion of the light S becomes large by the diffuser. As the second cause, as shown in FIG. 28, if an angle α of some (diffused light S1) of the light S diffused by the diffuser with respect to a surface (front surface 300A1) is larger than a critical angle of total reflection, it is believed that the front luminance is reduced since the diffused light S1 is not outputted to the outside by being reflected on the surface 300A1.

From this point, by providing a diffuser having the diffusion characteristic that the diffused light increases near a diffusion angle of 45° and decreases at equal to or more than a diffusion angle of 60°, it is judged that front luminance reduction becomes low and color variation due to a difference between observation angles can be effectively suppressed.

Here, diffused light intensity near the diffusion angle of 45° and at equal to or more than the diffusion angle of 60° required to obtain the diffuser which makes the front luminance reduction low and suppresses the color variation due to the difference between observation angles effectively is reviewed.

Figure 24:
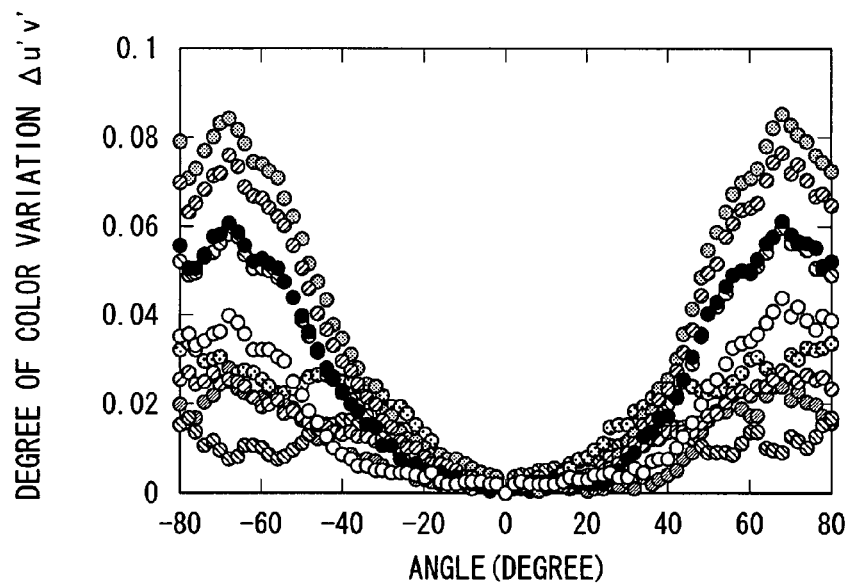
FIG. 24 is a view showing color variation depending on an angle in a conventional liquid crystal image display apparatus.
Figure 29:
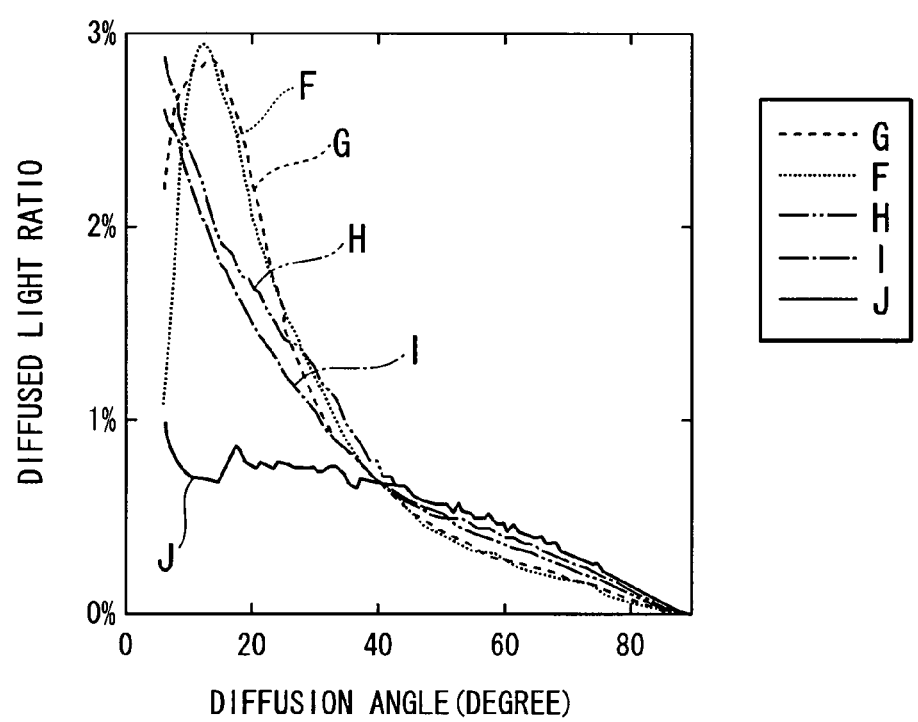
FIG. 29 is a view showing an example of a diffused light ratio depending on an angle.

As shown in FIG. 24, in the liquid crystal image display apparatus having the general VA type liquid crystal panel, chrominance Δu'v' (degree of color variation) measured when eight test colors specified in CIE1974 are displayed as test colors on the liquid crystal image display apparatus becomes 0.09 at the most. FIG. 29 shows a result of measurement of a diffused light ratio (that is, a ratio of the intensity of light which passes through the diffuser (output light intensity) to the intensity of light which is incident into the diffuser (incident light intensity)) depending on an observation angle for the diffusers F to J, shown in FIG. 26, having chrominance Δu'v' (degree of color variation) of 0.046 to 0.047 which is about half the maximum chrominance Δu'v' of 0.09. Table 3 shows a ratio of diffused light diffused in a range (θ1 in FIG. 23) of 35° to 55° for the diffusers F to J.

TABLE 3

| Diffuser | | Δu'v' | Ratio of light in observation angle range of 35° to 55° (%) |
|---|---|---|---|
| Diffuser | F | 0.046 | 11.2 |
| | G | 0.046 | 10.6 |

TABLE 3-continued

| | | Δu'v' | Ratio of light in observation angle range of 35° to 55° (%) |
|---|---|---|---|
| | H | 0.047 | 12.7 |
| | I | 0.046 | 12.6 |
| | J | 0.046 | 11.9 |

From these results, it is confirmed that the ratio of the diffused light diffused in the observation angle range of 35° to 55° of the overall diffused light for the diffusers F to J which have the chrominance Δu'v' of 0.046 to 0.047 and suppress color variation is 10% to 12% in the presence of a slight difference. Thus, when a diffuser (diffuser 310 in the present embodiment) has the diffusion characteristic which diffuses the light of equal to or more than 10% of the overall diffused light into the observation angle range of 35° to 55°, it is confirmed that it is possible to obtain an effective color variation suppression effect by which color variation is reduced by half or less as compared to the conventional techniques.

Figure 30:
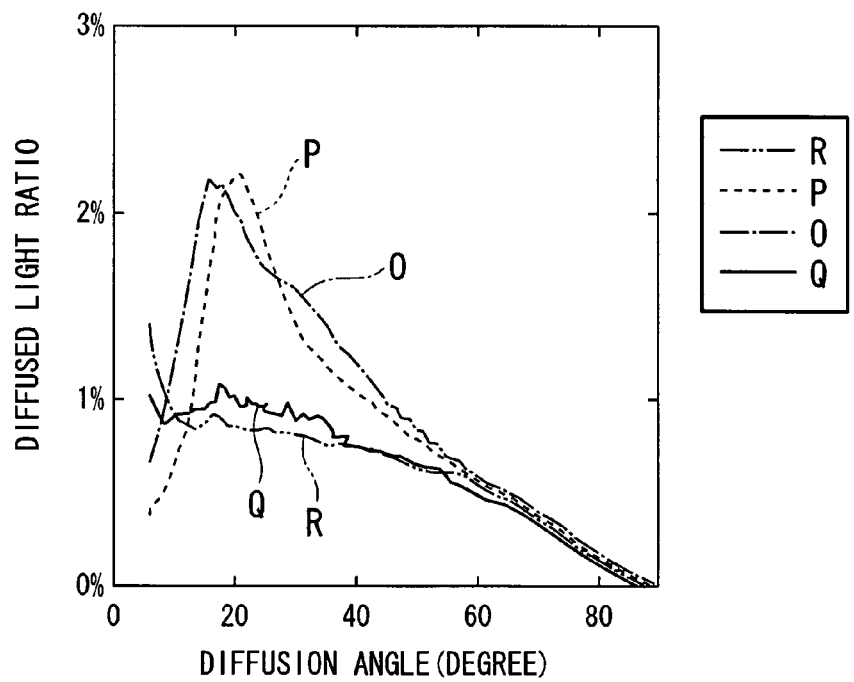
FIG. 30 is a view showing an example of a diffused light ratio depending on an angle.

FIG. 30 shows a diffused light ratio in an inclined direction for diffusers O to R having front luminance reduction rate of about 30%. Table 4 shows a ratio of diffused light diffused in an observation angle range of 60° to 90° for the diffusers O to R shown in FIG. 30.

TABLE 4

| | | Front luminance reduction rate | Ratio of light in observation angle range of 60° to 90° (%) |
|---|---|---|---|
| Diffuser | O | 33 | 8.5 |
| | P | 26 | 7.3 |
| | Q | 30 | 7.8 |
| | R | 29 | 7.6 |

From these results, it is confirmed as the diffusion characteristic of the diffuser that: the front luminance reduction rate can be restricted to about 30% when the diffused light diffused in the observation angle range of 60° to 90° amounts to 8% of the overall diffused light; and the front luminance reduction rate can be reduced to equal to or less than 30% when the diffused light diffused in this range amounts to equal to or less than 7% of the overall diffused light.

Based on the above results, in the diffuser 310, the diffusing film 311 having the same, the first polarizing film 304 and the liquid crystal image display apparatus 300A of the present embodiment shown in FIG. 23, since the diffuser 310 has the diffusion characteristic in which the light S of equal to or more than 10% is diffused in the angle range θ1 of 35° to 55° with respect to the front direction T while the light S of equal to or less than 7% of the overall light is diffused in the angle range θ2 of 60° to 90° with respect to the front direction T, color variation can be suppressed to about half or less as compared to conventional liquid crystal image display apparatuses while there occurs some front luminance reduction of less than 30%. Accordingly, it is possible to obtain the liquid crystal image display apparatus 300A which displays a clear image observable in any direction.

The present invention is not limited to the above embodiment, but may be modified in various ways without departing from the spirit of the present invention. For example, although it is illustrated in the present embodiment that the diffuser 310 of the diffusing film 311 includes the radiation curable resin 310b and the inner scattering elements (particles) 310a, the inner scattering elements 310a need not be particulate materials. For example, liquefied inner scattering elements may be mixed with and dispersed in the radiation curable resin 310b. In this case, the inner scattering elements 310a need not have a spherical particle shape, and scatter the light S depending on the size (average diameter) of the inner scattering elements (Mie scattering). In addition, the medium in which the inner scattering elements 310a are dispersed need not be limited to radiation curable resin 310b, but may be other material as long as it is transparent.

The diffuser of the present invention may be provided closer to the observer in the liquid crystal display apparatus than the polarizing layer. Although it is illustrated in the present embodiment that the diffusing film 311 forms a portion of the first polarizing film 304, the diffusing film 311 may be separated from the first polarizing film 304 (polarizing layer 307).

EXAMPLE 2

Hereinafter, Example 2 of the present invention will be described in detail. However, the present invention is not limited to Example 2.

Example 2 demonstrates that the diffuser 310, having the diffusion characteristic that equal to or more than 10% of the incident light S is diffused in the angle range θ1 of 35° to 55° in the front direction T while equal to or less than 7% of the incident light S is diffused in the angle range θ2 of 60° to 90° in the front direction T, can suppress color variation and front luminance reduction of the liquid crystal image display apparatus 300A.

In Example 2, the diffusing film 311 is formed by applying a solution which is made by dissolving vinyl acetate resin, any kind of acryl monomer, and an initiator for UV ray into methylethylketone (MEK), on the TAC film (plastic-based film 308), exposing the solution using the UV ray, and heating the exposed solution using an oven. In Example 2, the diffuser 310 having thickness of about 20 μm is formed using the above method.

Figure 31:
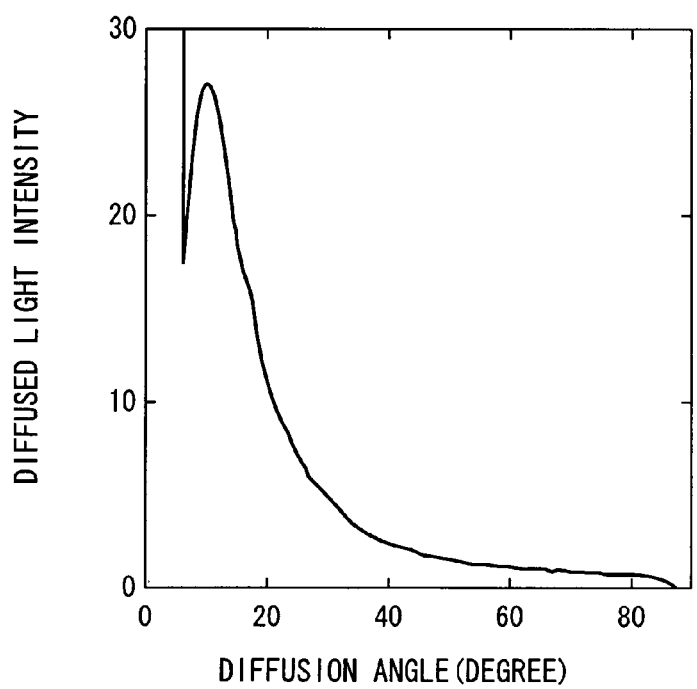
FIG. 31 is a view showing an example of diffused light intensity depending on an angle of light diffused by a diffuser according to the present invention.
Figure 32:
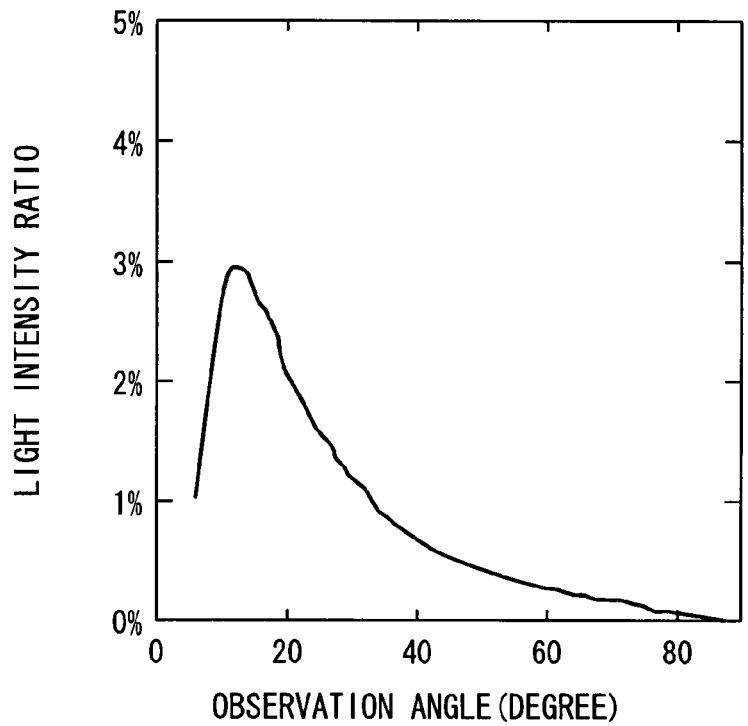
FIG. 32 is a view showing an example of a light intensity ratio depending on an angle of light diffused by a diffuser according to the present invention.

Parallel light S is vertically incident into the diffusing film 311 formed so, and then, the intensity of radiated light which passes through the diffusing film 311 is measured using EZ Contrast (available from Eldim Co., Ltd.). FIG. 31 shows measured diffused light intensity depending on a diffusion angle. FIG. 32 shows a relationship between an observation angle and a light intensity ratio, which is obtained based on the result shown in FIG. 31. A ratio of light S in the observation angle range θ1 of 35° to 55°, which is obtained based on the results shown in FIGS. 31 and 32, is about 11.2%, while a ratio of light S in the observation angle range θ2 of 60° to 90° is about 4%.

Figure 33:
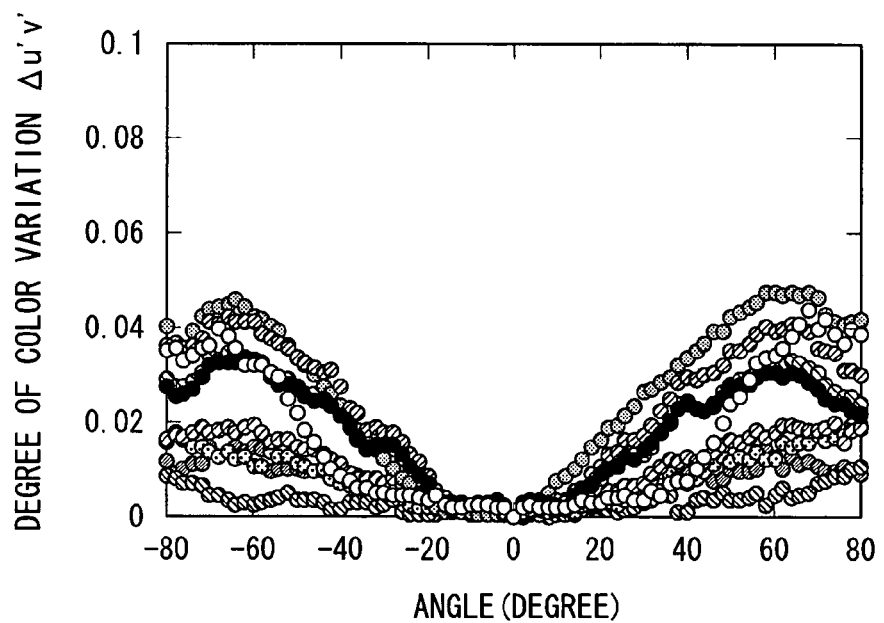
FIG. 33 is a view showing an example of color variation depending on an angle in a liquid crystal image display apparatus having a diffuser according to the present invention.

FIG. 33 shows chrominance Δu'v' obtained when the diffusing film 311 is provided in the VA type liquid crystal panel 301, as shown in FIG. 23 and eight test colors specified in CIE1974 are displayed as test colors on the screen of the liquid crystal image display apparatus 300A. An observation angle and a light intensity ratio of a conventional liquid crystal panel (original liquid crystal panel) without the diffuser of Example 2 are as shown in FIG. 24. The original liquid crystal panel has a maximum value of chrominance Δu'v' of about 0.09. The liquid crystal panel having the diffusing film 311 of Example 2 has a maximum value of chrominance Δu'v' of about 0.046.

At this time, front luminance of the original liquid crystal panel is about 420 cd while front luminance of the liquid crystal panel having the diffusing film 311 of Example 2 is about 350 cd. That is, luminance reduction by the diffusing film 311 can be suppressed by about 16%.

When viewed from the front surface 300A1, the observed image is good and shows little color variation and gradation variation depending on the view angle and with little luminance reduction.

As described above, it is demonstrated that the diffuser 310 having a diffusion characteristic of equal to or more than 10% of the incident light S is diffused in the angle range θ1 of 35° to 55° in the front direction T while equal to or less than 7% of the incident light S is diffused in the angle range θ2 of 60° to 90° in the front direction T can suppress color variation and front luminance reduction of the liquid crystal image display apparatus 300A.

EXAMPLE 3

Hereinafter, Example 3 of the present invention will be described in detail. However, the present invention is not limited to Example 3.

Example 3 demonstrates that the diffuser 310 formed by dispersing fillers (inner scattering elements 310a) with adjusted conditions of particle diameter, refraction index and so on into the resin 310b can suppress color variation and front luminance reduction of the liquid crystal image display apparatus 300A.

In Example 3, the diffusing film 311 is formed by dispersing silica fillers (inner scattering elements 310a) having particle diameter of 1 μm into acryl UV curable resin 310b, applying the acryl UV curable resin 310b on the TAC film 308, and exposing the acryl UV curable resin 310b using the UV ray. In Example 3, the diffuser 310 having a thickness of about 20 μm is formed using the above method.

Figure 34:
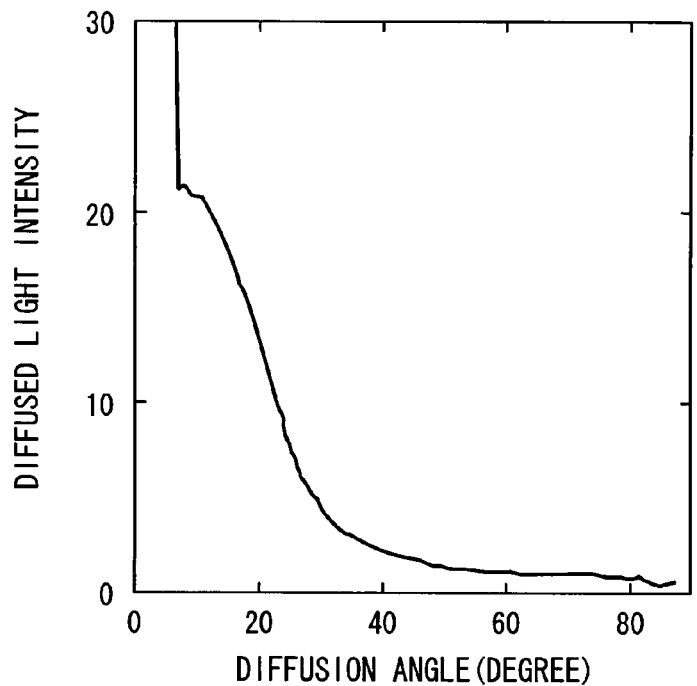
FIG. 34 is a view showing an example of diffused light intensity depending on an angle of light diffused by a diffuser according to the present invention.
Figure 35:
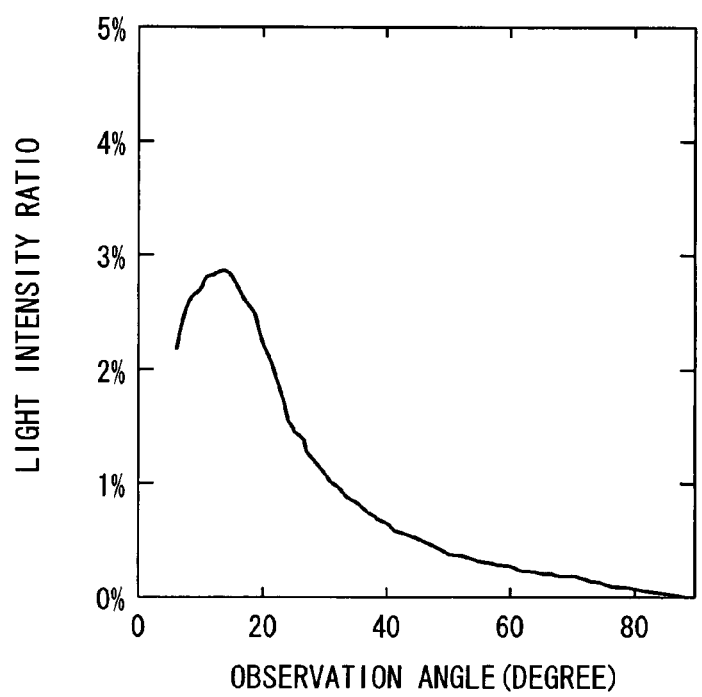
FIG. 35 is a view showing an example of a light intensity ratio depending on an angle of light diffused by a diffuser according to the present invention.

Parallel light S is vertically incident into the diffusing film 311 formed so, and then, intensity of diffused light which passes through and radiated from the diffusing film 311 is measured using EZ Contrast (available from Eldim Co., Ltd.). FIG. 34 shows measured diffused light intensity depending on the diffusion angle. FIG. 35 shows a relationship between an observation angle and a light intensity ratio which is obtained based on the result shown in FIG. 34. A ratio of light S in the observation angle range θ1 of 35° to 55° which is obtained based on the results shown in FIGS. 34 and 35, is about 10.6%, while a ratio of light S in the observation angle range θ2 of 60° to 90° is about 3.8%.

Figure 36:
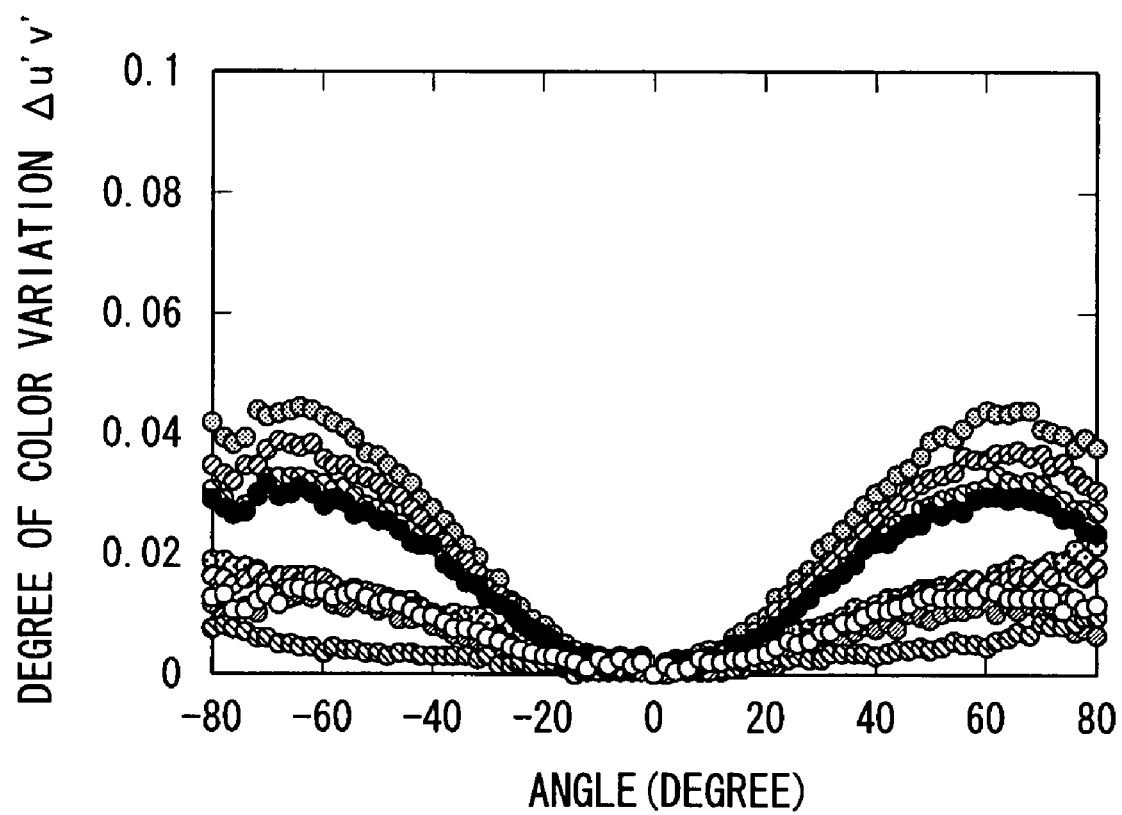
FIG. 36 is a view showing an example of color variation depending on an angle in a liquid crystal image display apparatus having a diffuser according to the present invention.

FIG. 36 shows chrominance Δu'v' obtained when the diffusing film 311 is provided in the VA type liquid crystal panel 301 and eight test colors specified in CIE1974 are displayed as test colors on the screen of the liquid crystal image display apparatus 300A. It is confirmed that the liquid crystal panel having the diffusing film 311 of Example 3 has the maximum value of chrominance Δu'v' of about 0.046 to 0.047.

At this time, front luminance of a liquid crystal panel without the diffuser 310 of Example 3 is about 420 cd while front luminance of the liquid crystal panel having the diffusing film 311 of Example 3 is about 360 cd. That is, luminance reduction by the diffuser 310 (diffusing film 311) can be suppressed by about 14%.

Like Example 2, a good image can be observed with little color variation and gradation variation depending on a view angle, and with little luminance reduction when viewed from the front side 300A1.

As described above, it is demonstrated that the diffusing film 311 (diffuser 310) of Example 3 having the diffusion characteristic that equal to or more than 10% of the incident light S is diffused in the angle range θ1 of 35° to 55° in the front direction T while equal to or less than 7% of the incident light S is diffused in the angle range θ2 of 60° to 90° in the front direction T can suppress color variation and front luminance reduction of the liquid crystal image display apparatus 300A.

Although a few examples of the present invention have been shown and described, the present invention is not limited to these examples. It will be appreciated by those skilled in the art that changes may be made in these examples without departing from the principles and spirit of the present invention, the scope of which is defined in the appended claims and their equivalents.

What is claimed is:

1. An optical device for a liquid crystal display apparatus that displays an image, the optical device being arranged at a front side of the liquid crystal display apparatus, comprising:
   a plastic-based film; and
   a diffusing layer formed at least one surface of the plastic-based film and scatters light that passes through the diffusing layer, the diffusing layer including:
      a medium; and inner scattering elements that selectively Mie-scatter visible light having a wavelength range of 400 nm to 500 nm into the medium, the inner scattering elements having a refraction index different from a refraction index of the medium, wherein the diffusing layer has pencil hardness of equal to or more than 2H under a 500 g-load specified in ISO/DIS 15184, and
   wherein, when the optical device is arranged at the front side of the liquid crystal display apparatus that displays color near eight test colors specified in CIE 1974, as a test color, the optical device being formed so that chrominance $\Delta u'v'$ obtained according to the following Equation 1 is equal to or less than 0.05, based on a chromaticity coordinate $(u_0', v_0')$ of CIE1976UCS observed in the front side and a chromaticity coordinate $(u', v')$ of CIE1976UCS observed at an observation angle of ±60 degrees in horizontal and vertical directions of a screen of the liquid crystal display apparatus when a direction perpendicular to the screen is assumed to be 0 degrees $$\Delta u'v' = \{(u'-u_0')^2 + (v'-v_0')^2\}^{0.5} \quad \text{[Equation 1]}.$$

2. The optical device according to claim 1, wherein the thickness of the diffusing layer is 2 μm to 30 μm.

3. The optical device according to claim 1, wherein the medium of the diffusing layer is made of a radiation curable resin, and the inner scattering elements are dispersed in the radiation curable resin.

4. The optical device according to claim 1, wherein the size of the inner scattering elements is 0.5 μm to 3.0 μm.

5. The optical device according to claim 1, wherein a difference in refraction index between the medium and the inner scattering elements is 0.05 to 0.6.

6. The optical device according to claim 1, wherein the inner scattering elements are particulate.

7. The optical device according to claim 1, wherein a surface of the diffusing layer is formed to be uneven.

8. The optical device according to claim 7, wherein at least one of the group consisting of some of the inner scattering elements and unevenness forming particles mixed into the medium of the diffusing layer, project from the surface of the diffusing layer.

9. The optical device according to claim 7, wherein the surface of the diffusing layer is formed to be uneven by an emboss process.

10. The optical device according to claim 1, wherein the optical device is used for the liquid crystal display apparatus having a vertical-aligned liquid crystal cell.

11. A polarizing plate comprising:
   a polarizing layer; and
   the optical device according to claim 1, the optical device being disposed on the polarizing layer.

12. A liquid crystal display apparatus comprising the polarizing plate according to claim 11, the polarizing plate being arranged at a front side at which an image of the liquid crystal display apparatus is displayed.

13. A liquid crystal image display apparatus comprising:
   a diffuser;
   an analyzer;
   a first biaxial phase difference optical device;
   a vertical alignment liquid crystal cell;
   a second biaxial phase difference optical device;
   a polarizer; and
   a backlight, which are arranged in order from a front side to a rear side, wherein
   the diffuser includes inner scattering elements that cause Mie scattering;
   the analyzer and the polarizer are arranged in cross-Nicol condition;
   slow axes of the first and second biaxial phase difference optical devices are arranged to be perpendicular to an absorption axis of the analyzer or the polarizer;
   the first and second biaxial phase difference optical devices compensate a phase difference of the liquid crystal cell; and
   the diffuser suppresses color shift in halftone.

14. The liquid crystal image display apparatus according to claim 13, wherein a spectral transmittance of light in an inclined direction during black image is displayed on the liquid crystal image display apparatus has the minimum value in a wavelength range of 410 nm to 610 nm.

15. The liquid crystal image display apparatus according to claim 13, wherein the first and second biaxial phase difference optical devices have the same phase difference.

16. The liquid crystal image display apparatus according to claim 13, further comprising a brightness enhancement film which enhances front luminance, and is arranged at a rear side of the liquid crystal cell.

17. A diffuser for use in a liquid crystal image display apparatus having a vertical-aligned liquid crystal cell, the diffuser being arranged at a front side at which an image of the liquid crystal panel is displayed, the diffuser suppressing color variation of the image which occurs when an observation angle at the front side is changed, wherein
   the diffuser has a diffusion characteristic of diffusing equal to or more than 10% of parallel light ray incident in a front direction perpendicular to the front side with an angle range of 35° to 55° with respect to the front direction and diffusing equal to or less than 7% of the parallel light ray with an angle range of 60° to 90° with respect to the front direction.

18. A diffusing film that is arranged at a front side at which an image of a vertical alignment type liquid crystal panel is displayed, the diffusing film diffusing light incident into the liquid crystal panel, comprising:
   a plastic-based film; and
   the diffuser according to claim 17, the diffuser being provided on the plastic-based film.

19. A polarizing film that is arranged at a front side at which an image of a vertical alignment type liquid crystal panel is displayed, the polarizing film polarizing light incident into the liquid crystal panel, comprising the diffuser according to claim 17, the diffuser being arranged at the front side at which the image is displayed.

20. A liquid crystal image display apparatus having a vertical alignment type liquid crystal panel, comprising the diffuser according to claim 17, the diffuser being arranged at a front side at which an image of the liquid crystal panel is displayed.

* * * * *